(12) United States Patent
Vouillot et al.

(10) Patent No.: US 12,445,025 B2
(45) Date of Patent: Oct. 14, 2025

(54) ELECTRIC GENERATOR PHASE RING HANDLING TOOL, A SYSTEM FOR SERVICING OR INSTALLING ONE OR MORE PHASE RINGS IN AN ELECTRIC GENERATOR COMPRISING SAID HANDLING TOOL AND A METHOD FOR SERVICING OR INSTALLING ONE OR MORE PHASE RINGS IN AN ELECTRIC GENERATOR WITH SAID SYSTEM

(71) Applicant: General Electric Technology GmbH, Baden (CH)

(72) Inventors: Romain Marie-Pierre Patrick Vouillot, Chavannes sur l'Etang (FR); Luc Andre Marie Breuillard, Essert (FR)

(73) Assignee: General Electric Technology GmbH, Baden (CH)

( * ) Notice: Subject to any disclaimer, the term of this patent is extended or adjusted under 35 U.S.C. 154(b) by 0 days.

(21) Appl. No.: 18/862,784

(22) PCT Filed: May 9, 2022

(86) PCT No.: PCT/IB2022/054290
§ 371 (c)(1),
(2) Date: Nov. 4, 2024

(87) PCT Pub. No.: WO2023/002261
PCT Pub. Date: Jan. 26, 2023

(65) Prior Publication Data
US 2025/0260297 A1   Aug. 14, 2025

(51) Int. Cl.
*H02K 15/30*     (2025.01)
*H02K 15/50*     (2025.01)

(52) U.S. Cl.
CPC ............ *H02K 15/30* (2025.01); *H02K 15/50* (2025.01); *H02K 2215/00* (2021.08)

(58) Field of Classification Search
CPC ..... H02K 15/30; H02K 15/50; H02K 2215/00
See application file for complete search history.

(56) References Cited

U.S. PATENT DOCUMENTS

| | | |
|---|---|---|
| 7,032,289 B2 | 4/2006 | Oliver et al. |
| 2003/0072643 A1 | 4/2003 | Oliver et al. |

(Continued)

FOREIGN PATENT DOCUMENTS

| | | | | |
|---|---|---|---|---|
| DE | 102009011478 A1 | * | 9/2010 | ............. F03D 13/10 |
| GB | 2 451 338 A | | 1/2009 | |
| WO | WO-2011124574 A1 | * | 10/2011 | |

*Primary Examiner* — Jeffrey T Carley
*Assistant Examiner* — Jose K Abraham
(74) *Attorney, Agent, or Firm* — Grogan, Tuccillo & Vanderleeden, LLP

(57) ABSTRACT

An electric generator phase ring handling tool, a phase ring loading tool, base loader, and a system and a method for servicing or installing one or more phase rings in an electric generator using the handling tool, the loading tool and the base loader. Phase rings can be picked up and transported to a generator, inserted into the generator, adjusted while inside the generator, and removed. Installation, removal and servicing of the rings in a generator avoids use of a crane and allows shorten generator outage duration. Without using a crane for installation, removal and servicing, the safety of workers performing these operations is enhanced. Also, increased precision in transporting, placing, installing, removing, and adjusting the rings is obtained, minimizing the risk of damage to the rings and the generator.

19 Claims, 23 Drawing Sheets

(56) References Cited

U.S. PATENT DOCUMENTS

| | | |
|---|---|---|
| 2012/0091853 A1 | 4/2012 | Dorsey |
| 2013/0121780 A1* | 5/2013 | Ressel .................... F03D 80/00 |
| | | 410/44 |
| 2013/0298366 A1 | 11/2013 | Vitello et al. |
| 2016/0164385 A1* | 6/2016 | Stalder ............... H02K 15/0414 |
| | | 29/732 |
| 2017/0356592 A1* | 12/2017 | Edwards ................ H02K 15/50 |

\* cited by examiner

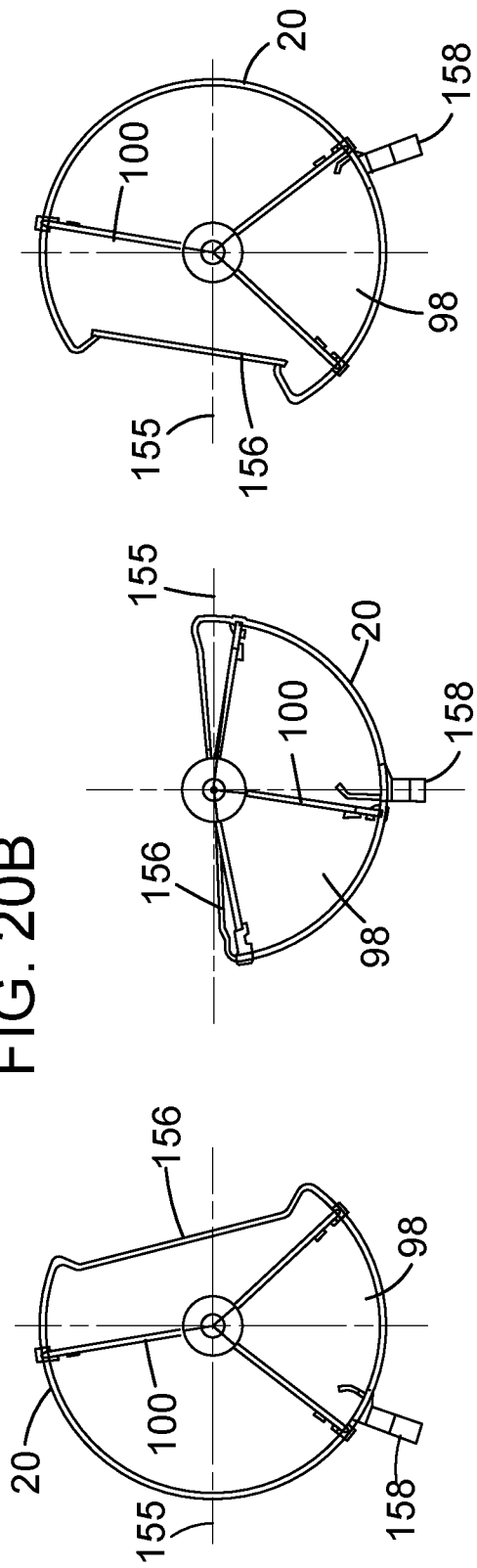

ELECTRIC GENERATOR PHASE RING HANDLING TOOL, A SYSTEM FOR SERVICING OR INSTALLING ONE OR MORE PHASE RINGS IN AN ELECTRIC GENERATOR COMPRISING SAID HANDLING TOOL AND A METHOD FOR SERVICING OR INSTALLING ONE OR MORE PHASE RINGS IN AN ELECTRIC GENERATOR WITH SAID SYSTEM

BACKGROUND

Technical Field

Embodiments of this disclosure relate generally to electric generators, and more specifically, to the installation and service of phase rings that encircle an end of a generator stator.

Discussion of Art

Electric generators driven by turbines are commonly used by power utilities to produce electrical energy. An electric generator such as a hydrogen or liquid cooled generator generally includes a casing that houses a stator with stator windings formed from connected stator bars. Phase rings encircling the stator are connected to the stator windings. Bushings that penetrate the casing are connected with the phase rings. In this manner, an electrical connection is formed between the stator windings, the phase rings, and the bushings that enables the transfer of electrical energy from the stator through the casing to feed an electric grid.

Leakage of coolant can lead to corrosions in brazed joints at the connections between the phase rings and the stator windings. This may make it necessary to replace the phase rings following the detection of leakage at any of the brazed joints. Replacing the phase rings can be performed during generator rewinds. A crane is typically used to replace the phase rings with new phase rings. For example, the crane can be employed to remove the used phase rings from the generator, pick up the new phase rings, carry them to the generator and position the new rings in a location that facilitates their installation within the generator. Using the crane to install or remove phase rings is a slow and cumbersome process that can take up to 20 days in some instances. Not only is using a crane to install and remove phase rings a slow and cumbersome process, but it can also be a challenge for power plant operators to find cranes that are available to perform such operations. The uncertainty of crane availability is a challenge from a service perspective if required work cannot be planned with confidence that it can be completed in a timely manner. Having a generator outage for a length of time that can span 20 days is very costly for the power plant operators.

Other concerns that arise with the use of a crane during installation of the phase rings, or while performing general maintenance operations, pertain to the safety of the workers that carry out such work. For example, it can be difficult for the crane to control the load associated with the phase rings. This can lead to uncontrolled swinging and spinning of the phase rings that can be dangerous to the workers tasked with the installation and servicing of the phase rings if the load is not stabilized. In addition, the uncontrolled swinging and spinning of the phase rings can elevate the risk of damage to the phase rings, as well as other components of the generator due to unintentional contact made by the crane.

Document U.S. Pat. No. 7,032,289 B2 discloses a stator bar handler. This handler is not suitable for handling phase rings and its only capable for moving in axial and vertical directions.

Accordingly, there is a need for an approach that does not rely on the use of a crane to facilitate the installation, removal and servicing of phase rings used in an electric generator. Additionally, there is a need for an approach that will allow to shorten the time needed to perform service on an electric generator without impairing safety of workers.

BRIEF DESCRIPTION

Below is a general description of various embodiments which may or may not be included in the scope of protections provided by the claims. The purpose of this general description is to explain in the broadest sense the purpose and functioning of the invention and to discuss various possible modifications thereof.

The various embodiments of an electric generator phase ring handling tool obviate the need to use a crane to facilitate the installation, removal and servicing of phase rings deployed in an electric generator. Additionally, embodiments of the electric generator phase ring handling tool allow one to perform service on electric generators without removing winding from said electric generators thereby further shortening the time needed to service said electric generators. In one embodiment, the electric generator phase ring handling tool includes a base unit configured to move in a fore and aft direction. The base unit includes a front end part, a back end part and a vertical extending part between the front end part and the back end part. In this embodiment, the tool includes a vertical support structure coupled to the base unit and the vertical support structure is configured to tilt towards and away from the vertical extending part. The tool further includes a phase ring support head coupled to the vertical support structure. The phase ring support head is configured to rotate and move along the vertical extending part of the base unit. The tool includes at least three support arms coupled to the phase ring support head and said at least three support arms are configured to support one or more electric generator phase rings. The use of three arms provides stable grip which cannot be achieved with two arms. At the same time, the use of three arms offers greatest maneuverability within an electric generator. A higher number of support arms, e.g., four, five, six, seven etc. can be used with the tool to provide even more stable grip. For this tool, the vertical extending part is coupled to the vertical support structure with a first drive system. The first drive system is configured to tilt the vertical support structure towards and away from the vertical extending part of the base unit.

A possibility for the base unit to move in a fore and aft direction, for the vertical support structure to tilt towards and way from the vertical extending part and for the phase ring support head to rotate and move along the vertical extending part together with support arms coupled to it provide movement of a tool in all directions needed to perform installation of a phase ring or rings and service of a phase ring or rings within an electric generator without the need to use a crane and with a winding still installed in the electric generator.

The tool can be used with electric generators of any size. Thus, for example, the tool can work with the biggest generators combined with Arabelle-class nuclear steam turbines or with smaller generators operating with a fossil boiler steam source.

In an embodiment, the first drive system can be only hand-operated and/or only hand-powered.

In one embodiment, the vertical support structure comprises a second drive system operatively coupled to the phase ring support head, wherein the second drive system is configured to rotate the phase ring support head in relation to the vertical extending part of the base unit.

In another embodiment, the second drive system is a screw drive system and/or the second drive system is only hand-operated and/or only hand-powered.

In one embodiment, the vertical support structure comprises a third drive system configured to displace the phase ring support head in a vertical direction along the vertical support structure The third drive system can comprise a chain hoist assembly configured to displace the phase ring support head in a vertical direction along the vertical support structure. Furthermore, the chain hoist assembly can comprise vertically extending spaced railings disposed on the vertical support structure, a phase ring support head trolley to secure the phase ring support head thereto and configured to move along the vertically extending spaced railings, and a pull chain operatively coupled with the phase ring support head trolley that is configured to translate the phase ring support head trolley along the vertically extending spaced railings in the vertical direction. Additionally, the phase ring support head trolley comprises horizontally extending spaced railings oriented transversely in relation to the vertical support structure and a screw drive system operatively coupled to the phase ring support head trolley, wherein the screw drive system is configured to translate the phase ring support head trolley along the horizontally extending spaced railings, moving the phase ring support head trolley in a lateral direction in relation to the vertical support structure.

In another embodiment, the third drive system is only hand-operated and/or only hand-powered.

In yet another embodiment, the back end part of the base unit comprise a weight assembly for countering the weight of said one or more electric generator phase rings. This particular placement of weights is beneficial to stabilize the tool and to shift the center of gravity towards the center of the tool.

In another embodiment, the electric generator phase ring handling tool further comprises a base loader for supporting the base unit on said base loader, wherein the base loader includes one, two or more rails configured to move the base unit in a fore and aft direction along said one, two or more rails and wherein the base loader includes an industrial vehicle coupling receptacles configured to receive forks of a forklift. Placing the tool on said base loader which can be safely transported using a forklift makes the tool easy to transport within a power plant. Also, availability of the tool is higher since forklifts are available on a power plant in a greater number in comparison to e.g., cranes. It follows that using the tool with the base loader additionally speeds-up preparation to and conducting service or installation or removal of a phase ring or phase rings from an electric generator. In yet another embodiment, the base loader can have mountings and thus be configured to work with a crane. Therefore, it will be possible to transport the tool on the base loader also using said crane.

The electric generator phase ring handling tool can further include a number of actuation tools that facilitate movement of one or more of the components of the phase ring handling tool including the base unit, the vertical support structure, the phase ring support head, and the plurality of support arms. Said actuation tools can be hand-powered and/or hand-operated. For example, the base unit can be configured to operate cooperatively with a trolley system that is operative to translate the base unit in the fore and aft direction. A screw drive system can be operatively coupled to the vertical support structure and the vertical extending part of the base unit to tilt the vertical support structure in relation to the vertical extending part of the base unit. Additionally, a screw drive system can be operatively coupled to the phase ring support head to rotate the phase ring support head in relation to the vertical support structure and the vertical extending part of the base unit. In one example, the aforementioned screw drive systems can include a screw and a hand wheel that is configured to drive the screw to translate the components in their corresponding directional manner.

Said at least three support arms can be configured in any of a number of arrangements to facilitate the support of one or more phase rings. For example, each support arm can be spaced apart a predetermined distance from the other support arms. The support arms, which can extend radially outward from the phase ring support head, can be configured in any number of spacing arrangements that will support the phase rings during pick-up, transportation, installation, removal and maintenance. In addition, each of the support arms can include a gripper portion at an end distal to the phase ring support head that is configured to support the phase rings. Said gripper portion can support one or more phase rings from the inner side of said one or more phase rings or from the outer side of said one or more phase rings.

In some embodiments, one support arm comprises a gripper portion that supports one or more phase rings from the inner side of said one or more phase rings and other, for example, two arms that comprise gripper portions that support one or more phase rings from the outer side of said one or more phase rings. This particular configuration of three arms with above-defined gripper portions is beneficial in terms of achieving the most stable grip on said one or more phase rings when using the tool according to the invention without a need to increase the number of arms.

With the phase ring handling tool described herein, new phase rings can be picked-up, carried to the generator, and put in position to facilitate installation in the generator. In addition, the phase ring handling tool can be used to remove used phase rings from the generator or to facilitate service operations of the phase rings while installed in the generator. In all of these operations, the use of a crane can be avoided or at least limited to minimum. Without the need for a crane to perform these operations, installation, servicing of one or more phase rings can be done faster and/or in a more flexible manner as there is no need to queue for a crane. Also, worker safety is enhanced because uncontrolled swinging, spinning and rotating of the phase rings that arises with the use of a crane is no longer an issue that can harm the workers. In addition, the various degrees of movement that the phase ring handling tool can undergo brings a level of precision to the installation, removal, and servicing of the phase rings that is not attainable with use of a crane. This is even enhanced by the fact that operator can adjust the tool easily while closely observing its position/position of one or more phase rings with respect to other elements of an electric generator. As a result, the risk of damage to the phase rings and to the other components of the generator during the installation and service operations as well as the time needed for servicing or installation is substantially minimized with the use of the phase ring handling tool. Same benefits apply when use of a crane is minimized.

Additionally, in embodiments the phase ring handling tool allows for supporting of one or more phase rings at all times during servicing or installation. Another benefit of the tool is that there is no need for workers to manually hold one or more phase rings, which increases safety.

In one embodiment, the phase ring handling tool can include a base loader. The base loader can comprise a platform having a top side and a bottom side, a plurality of bottom side beams coupled to the bottom side of the platform; one, two or more rails coupled to the top side of the platform; and a phase ring handling tool carriage configured to receive the phase ring handling tool and travel along said one or more rails with the phase ring handling tool thereon. Said plurality of bottom side beams coupled to the bottom side of the platform support the platform and create a space between the platform and the ground.

In another embodiment, the phase ring handling tool comprises at least two base loaders, wherein at least one base loader comprises a platform having a top side and a bottom side and at least two bottom side beams coupled to the bottom side of the platform, wherein said bottom side beams are longer than the platform and are configured to support said at least one base loader on another said base loader. Said bottom side beams in this configuration allow to fix a space between the phase ring handling tool and a phase ring loading tool as described herein. This facilitates preparation and thus speeds up the whole process of using the tool. Additionally, said bottom side beams allow to transport two said base loaders stacked on each other with the phase ring handling tool placed on top of them. This makes the whole unit compact, easy and fast to transport to a place where the tool is needed. This also allows to use a smaller phase ring handling tool which additionally facilitates use and transportation of the tool. The use of two base loaders as described herein allows to place one said base loader next to an electric generator and one next to, e.g., said phase ring loading tool, which allows for faster and safer service of said electric generator since only the phase ring handling tool with one or more phase rings needs to be transported to the electric generator and there is no need to reposition said base loader.

In one embodiment, a phase ring loading tool is disclosed that is configured to work in conjunction with the phase ring handling tool in the loading, transportation, and installation of one or more phase rings in a generator, as well as with the removal of one or more phase rings from the generator. Thus, this embodiment pertains to a system for servicing or installing one or more phase rings in an electric generator. The phase ring loading tool is configured to support said one or more phase rings when said one or more phase rings are oriented parallel to the ground and perpendicular to the ground. The phase ring handling tool is defined in other embodiments and is used in the system to remove said one or more phase rings from the phase ring loading tool and to facilitate installation of the one or more phase rings in the electric generator. In the same or another embodiment, the phase ring handling tool facilitates removal of the one or more phase rings from the electric generator and places said one or more phase rings in the phase ring loading tool.

In one embodiment, the phase ring loading tool can include a frame structure including a first end part, a second end part, and a middle part between the first end part and the second end part. The frame structure having spaced beams extending from the first end part to the second end part, first end protruding beams extending outward from each of the spaced beams at the first end part, and second end protruding beams extending outward from each of the spaced beams at the second end part. The frame structure can have a truss assembly in the middle part to provide geometric stability to the spaced beams extending from the first end part to the second end part, at least three arms configured to support said one or more phase rings parallel to the spaced beams, and wherein the second end part is configured to support the phase ring loading tool in the upright position.

In another embodiment, the phase ring loading tool can include a first arm bracket support assembly coupled to the frame structure between the first end part and the middle part and a second arm bracket support assembly coupled to the frame structure between the middle part and the second end part. The first arm bracket support assembly can include at least one said arm and the second arm bracket support assembly can include at least two said arms.

In yet another embodiment, the first arm bracket support assembly can include two arms and the second arm bracket support assembly includes four arms. This particular configuration of arms is beneficial in terms of stability of one or more phase rings supported in the phase ring loading tool.

The phase ring loading tool can be operated in any of a number of different arrangements. For example, the phase ring loading tool can be configured to receive the one or more phase rings while in a horizontal orientation. In another scenario, the phase ring handling tool can be tilted from a horizontal orientation to a vertical orientation so that the one or more phase rings can be removed from the phase ring loading tool. The phase ring loading tool allows one or more phase rings to be prepared in it and thus contributes to faster servicing/installation. For example, to achieve replacement of said ring or rings in 13 days. The phase ring loading tool is also beneficial as it allows tilting of 6 phase rings in one shoot with a crane and thus has no impact of the crane availability during phase ring replacement or installation. This loading tool also allows for handling of phase rings from a transportation box to assembly on the phase ring loading tool without phase ring tilting. This has great benefits in terms of facilitating the phase ring handling and the workers' safety. Additionally, this tool allows to check the phase rings before outage thereby allows for, e.g., detect any problems with a phase ring without stopping electric generator. This prevents situations in which an electric generator is stopped just to realize that servicing or installation cannot be completed due to e.g., incompatible or faulty phase ring or rings.

In one embodiment, a method for servicing or installing one or more phase rings in an electric generator is provided. The method includes the use of a system for servicing or installing one or more phase rings in an electric generator as disclosed herein. In particular, the system comprises a phase ring loading tool configured to receive said one or more phase rings and a phase ring handling tool as defined herein to remove said one or more phase rings from the phase ring loading tool and to facilitate installation of the one or more phase rings in the electric generator. The method comprises assembling said one or more phase rings on the phase ring loading tool to obtain assembled one or more phase rings on the phase ring loading tool, wherein the phase ring loading tool is in the horizontal position. This particular step allows to assemble one or more phase rings while an electric generator is still working and producing power. This is beneficial as it allows to limit outage of the electric generator. Additionally, assembling in this position provides greater control over the whole process of servicing or installing of one or more phase rings in an electric generator thereby increasing safety of the whole process. A possibility to check said one or more phase rings without the need to stop an electric generator allows to minimize shortage of power. Subsequently, the method comprises elevating the phase ring loading tool to the upright position together with the assembled one or more phase rings. This particular step has the same benefits as the previous one in terms of limitation of the time when the electric generator is not working due to servicing. The elevating step can be done with the help of any available machine suitable to elevate, e.g., with a crane. It should be noted that use of a crane to elevate the tool does not require using said crane for a prolonged period of time. This means that queuing a crane is easier. Subsequently, the method comprises removing the one or more phase rings from the phase ring loading tool with the phase ring handling tool. It should be noted that during this step, the electric generator can still produce power. Finally, the method comprises installing the one or more electric generator phase rings in the electric generator with the phase ring handling tool.

In embodiments, the method may be specifically pertaining to servicing of electric generators. For servicing, there is a need to remove already installed one or more phase rings from an electric generator. Servicing procedure can involve one or at least two phase ring handling tools. In one embodiment, after the step of elevating the phase ring loading tool to the upright position and before the step of removing the one or more phase rings from the phase ring loading tool with the phase ring handling tool the method further comprises removing one or more phase rings from the electric generator with the phase ring handling tool. It should be noted that for this particular servicing, only one phase ring handling tool is needed which is beneficial in terms of the time and effort needed to transport two or more phase ring handling tools to electric generator that requires servicing of one or more phase rings. In another embodiment, after the step of removing the one or more phase rings from the phase ring loading tool with the phase ring handling tool and before the step of installing the one or more electric generator phase rings in the electric generator with the phase ring handling tool, the method further comprises removing one or more phase rings from the electric generator with another phase ring handling tool.

In one embodiment, the method of servicing or installing involves an electric generator combined with a nuclear steam source at a nuclear power plant or combined with a fossil steam source at a fossil power plant or the electric generator is a mockup. It should be noted that not all tools can be used both on generators used on fossil power plants and nuclear power plants. This is because some servicing tools are limited to generators of particular size or configuration. A phase ring handling tool as well as phase ring loading tool according to the disclosure, can be used with generators of any size and configuration. In particular, the phase ring handling tool and the phase ring loading tool can be used with the largest generators combined with the largest steam turbines (Arabelle™-class) and with the smallest generators used on fossil plants. Said tools can also be used with a mockup of an electric generator to train operators and servicing teams which will both decrease the time needed for servicing or installing one or more phase rings, and will have an impact on safety of servicing or installation. Specifically, in embodiments, the method allows to train the team to decrease likelihood of occurrence of noticeable and catastrophic risk-events from seldom probability to improbable probability.

The phase ring handling tool, the phase ring loading tool, and the base loader as described herein, can also be used in a system and a method for simulating installation of phase rings in a generator for purposes of training personnel. In this manner, quality and productivity of these operations can be enhanced as can worker safety. In these embodiments, a mockup of a stator end of an electric generator can be provided. The mockup of the stator end can include a stator body having a plurality of axially oriented slots extending radially outward from a center of the stator body that are configured to receive stator windings. The phase ring handling tool, the phase ring loading tool, and the base loader can be used to facilitate installation of the one or more phase rings in the stator end of the mockup.

The term "only hand-operated" means that a particular part or tool is operated using operator's hand. In some embodiments, it means that no mechanical and/or electronical device is used to operate said part or tool. Embodiments of a tool according to the invention including parts which are only hand-operated are beneficial as they allow to precisely maneuver the tool according to the invention within an electric generator and position the tool according to the invention fast and precise. This is required to perform service for an electric generator with winding as the tool can be operated fast and precise to perform the service without risking of damaging the winding.

The term "only hand-powered" means that a particular part or tool is powered only using muscles of its operator. In some embodiments, it means that no mechanical device is additionally powering said part or tool. Embodiments of the invention including parts which are only hand-powered are beneficial as they allow to safely maneuver a tool according to the invention within an electric generator without risking of damaging of elements of the electric generator. The beneficial embodiments of the invention incorporate parts that are both only hand-operated and only hand-powered as they allow its operator or operators performing service or building a new electric generator to perform their tasks fast, precise and without rising of damaging of elements of the electric generator.

Various embodiments disclosed in the description and in the claims can be combined together in any order and number to produce new embodiments that from part of the disclosure.

DRAWINGS

The present invention will be better understood from reading the following description of non-limiting embodiments, with reference to the attached drawings, wherein below:

FIGS. 20A-20F show various spacing arrangements of the plurality of the support arms according to embodiments of the present invention;

Figure 22:
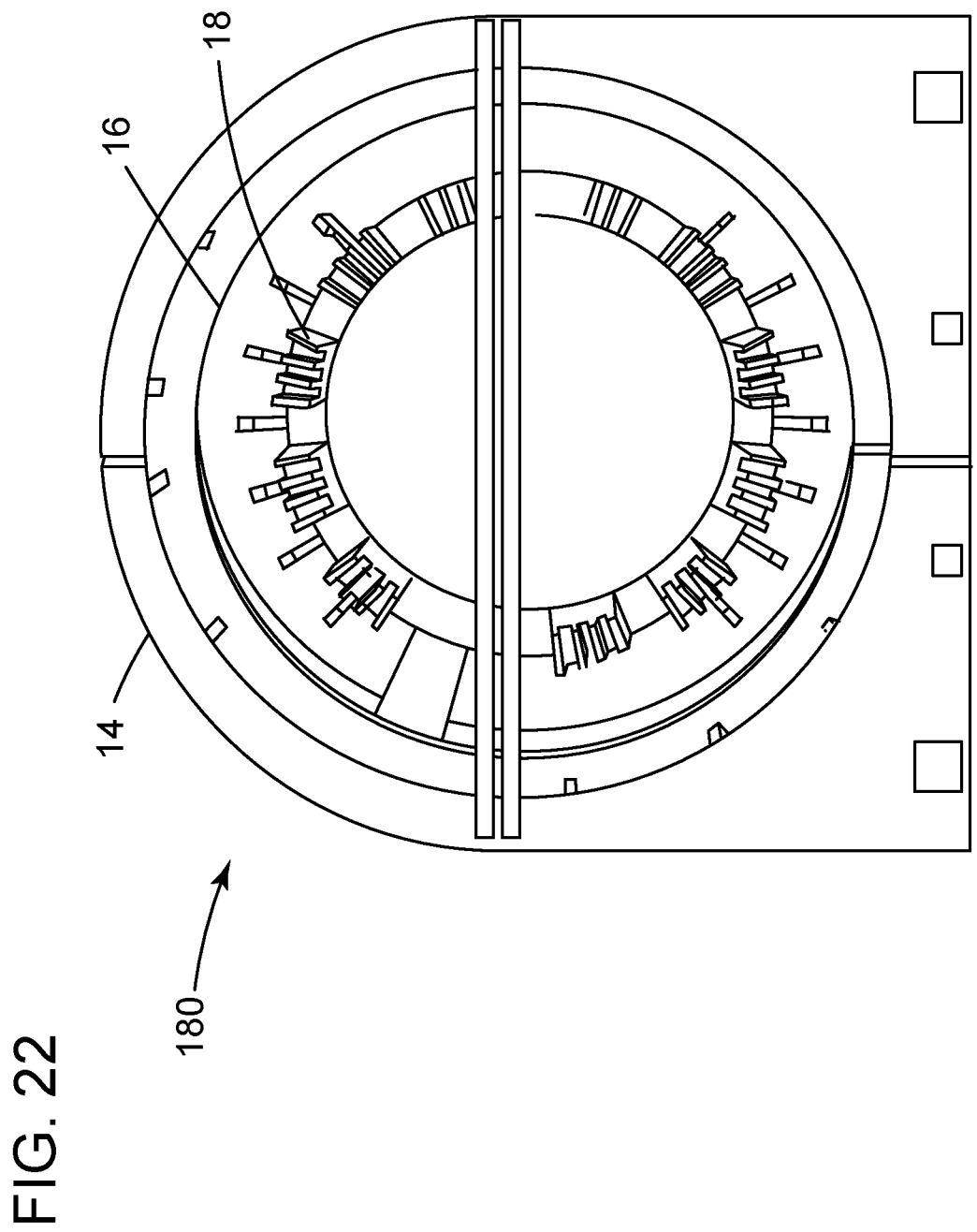
Figure 23:
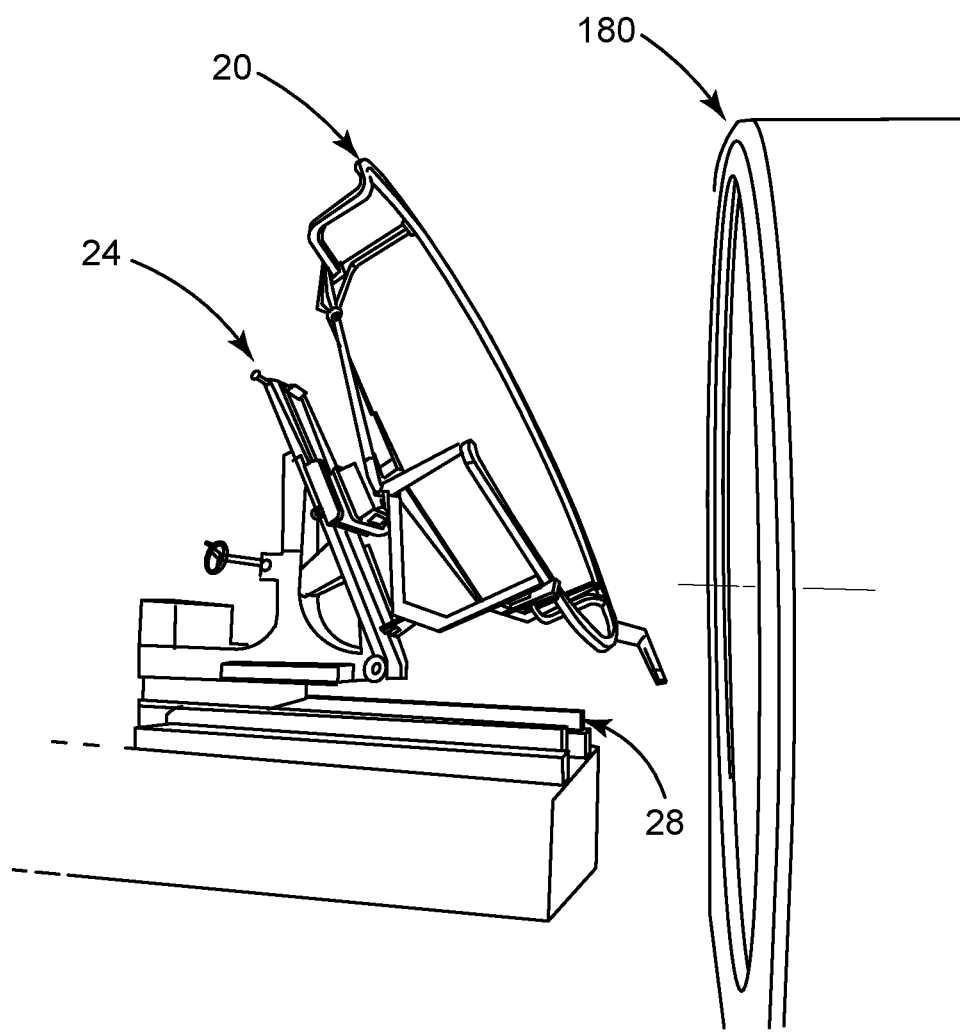

FIG. 22 is a schematic showing a mockup of a stator end of an electric generator that can be used with the phase ring handling tool to simulate installation of phase rings in a generator for training personnel according to an embodiment of the present invention; and FIG. 23 is a schematic showing the phase ring handling tool and the base loader in use with the mockup of the stator end of the electric generator depicted in FIG. 22 according to an embodiment of the present invention.

DETAILED DESCRIPTION

Example embodiments of the present invention will be described more fully hereinafter with reference to the accompanying drawings, in which some, but not all embodiments are shown. The present invention may be embodied in many different forms and should not be construed as limited to the embodiments set forth herein; rather these embodiments are provided so that this disclosure will satisfy applicable legal requirements. Like numbers may refer to like elements throughout.

Figure 1:
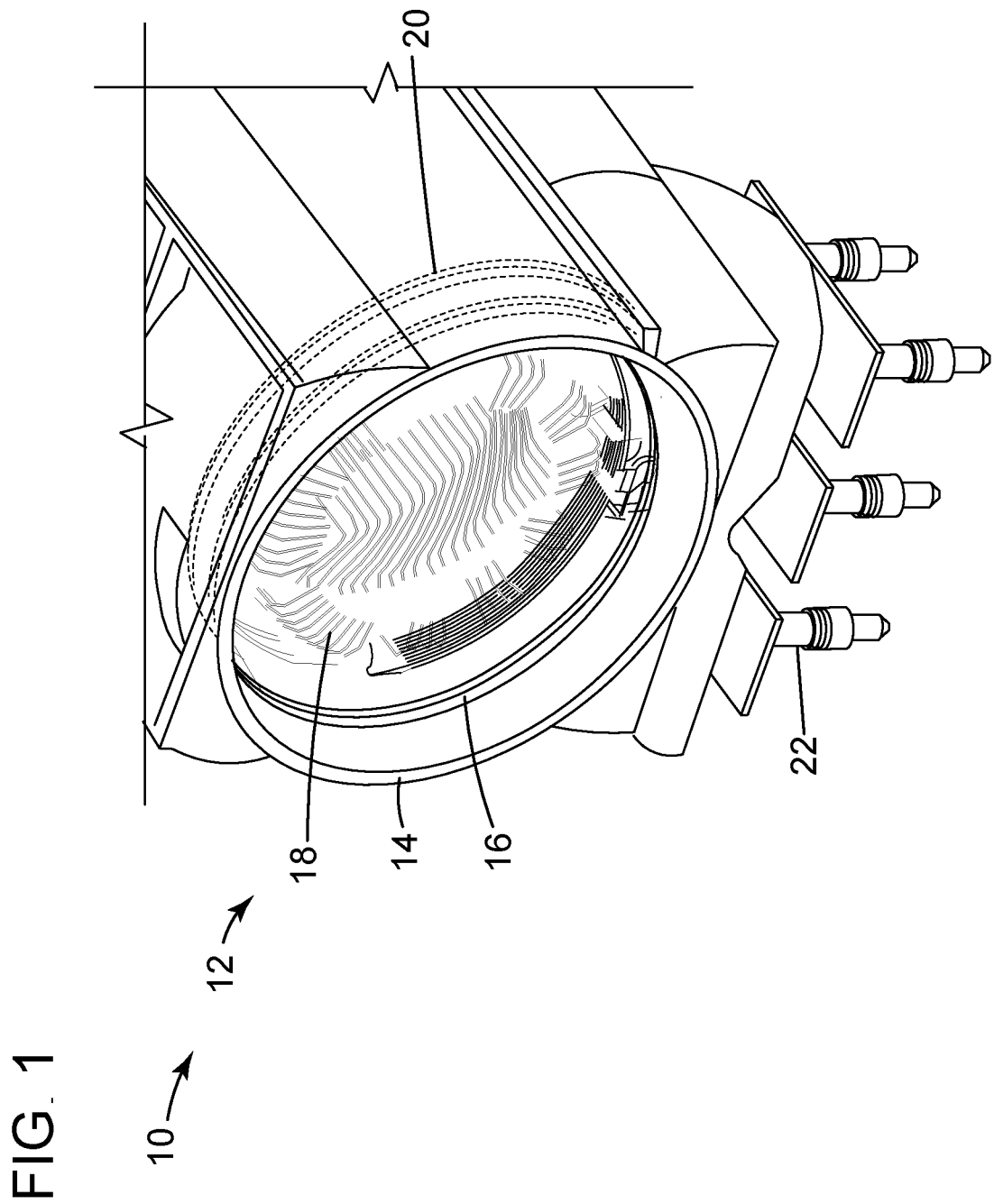
FIG. 1 is a perspective of a schematic view of a stator end of a generator according to an embodiment of the present invention.

Turning now to the figures, FIG. 1 is a perspective of a schematic view of a stator end 10 of a dynamoelectric machine such as a generator 12. As shown in FIG. 1, the generator 12 includes a casing 14 that houses a stator 16 with stator or armature windings 18 formed from connected stator bars that are distributed circumferentially about the stator. Phase rings 20 encircling the stator 16 are connected to the stator windings 18. Bushings 22 that penetrate the casing 14 into the stator 16 are connected with the phase rings 20. For purposes of clarity in describing components of the generator 12 that are relevant to the various embodiments described herein, other components that can form part of the generator 12 are not depicted. For example, the generator 12 can include a rotor and a rotor shaft mounted within the stator 16. The rotor can be wrapped in field windings which produce a constant magnetic field that can interact with the stator windings 18 which can be fed by a system of three-phase AC voltages. Electrical energy produced from the interaction of the field windings and the stator windings 18 is transferred from the generator 12 to an electric grid via the phase rings 20 that encircle the windings and the bushings 22 that extend through the stator 16 and the casing 14 to connect to the phase rings.

In some instances, it may be necessary to service the phase rings 20. This service of the phase rings 20 can include replacing the rings after detection of coolant leakage in brazed joints at the connections between the phase rings 20 and the stator windings 18. The various embodiments described herein are directed to installing new phase rings 20 after removal of the used rings. In addition to being used for installing new phase rings 20, the embodiments can be utilized during routine maintenance such as for example during generator rewinds or while the windings are still installed in the generator 12. Also, the embodiments have utility in the removal of the phase rings 20 from the generator 12 after the stator windings 18 have been disconnected from the rings.

Figure 2:
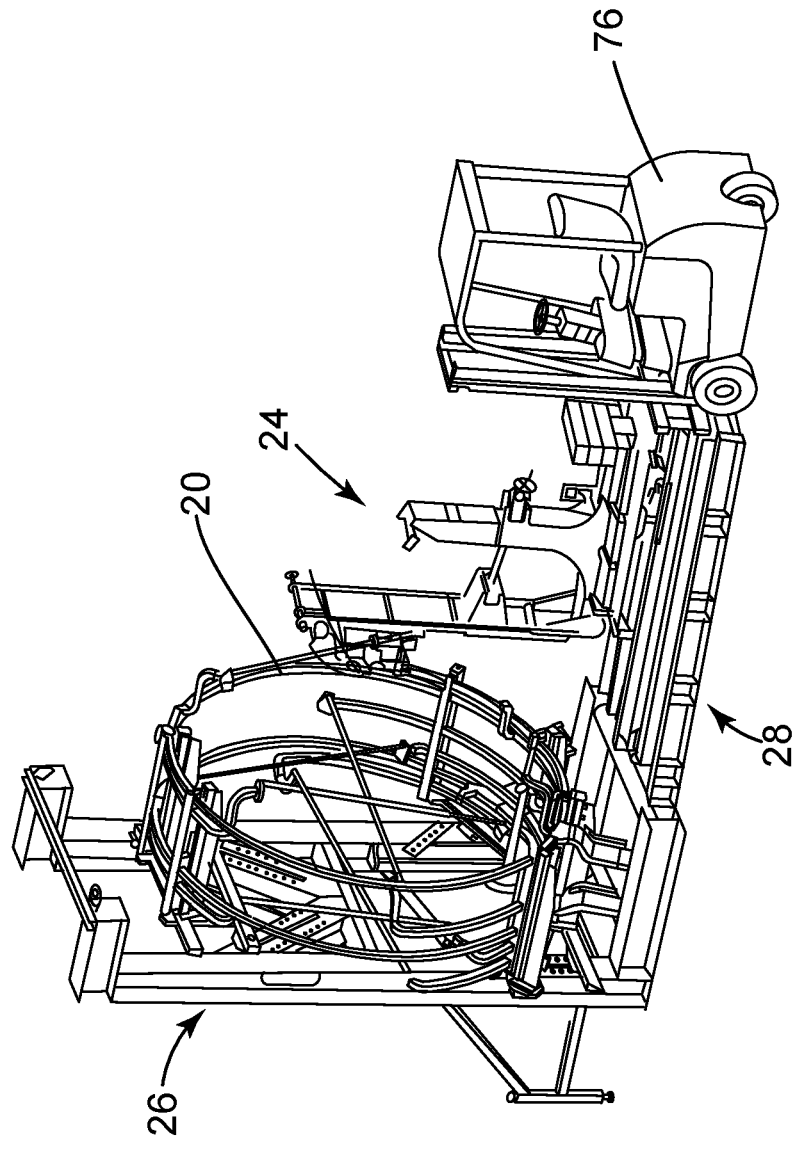
FIG. 2 is a schematic of a phase ring handling tool, a phase ring loading tool, and a base loader operating in conjunction to ready phase rings for installation in a generator according to an embodiment of the present invention.
Figure 3:
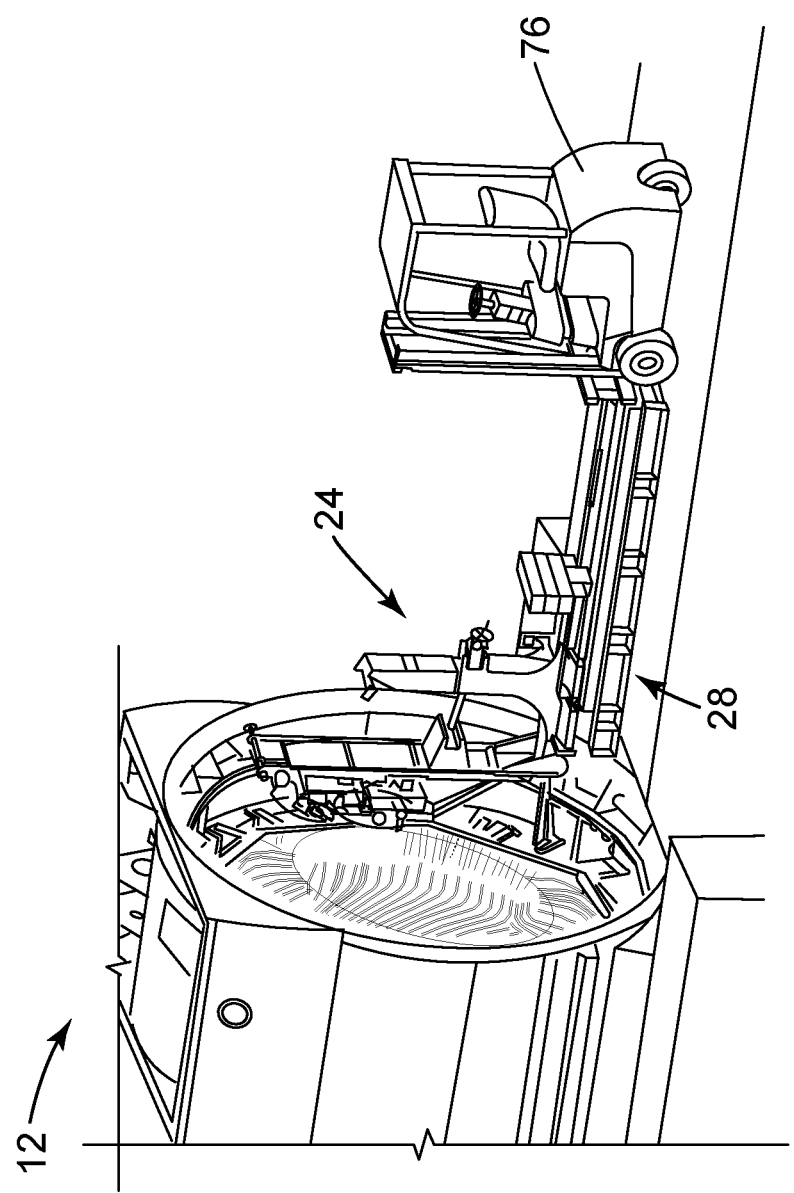
FIG. 3 is a schematic of the phase ring handling tool and the base loader operating in conjunction to load phase rings in a generator according to an embodiment of the present invention.

In general, the embodiments are directed to a phase ring handling tool that can be used in the installation, servicing and removal of the phase rings 20; a phase ring loading tool that can be used to ready the phase rings 20 for installation in the generator 12; and a base loader that can be used with both the phase ring handling tool and the phase ring loading tool to facilitate phase ring installation, removal and servicing. FIG. 2 shows a schematic of a phase ring handling tool 24, a phase ring loading tool 26, and a base loader 28 operating in conjunction as part of a system for readying the load phase rings 20 for installation in the generator 12. FIG. 3 is a schematic of the phase ring handling tool 24, and the base loader 28 operating in conjunction as part of a system for installing phase rings 20 in the generator 12. Further details of the phase ring handling tool 24, the phase ring loading tool 26, and the base loader 28 are discussed below.

Figure 4:
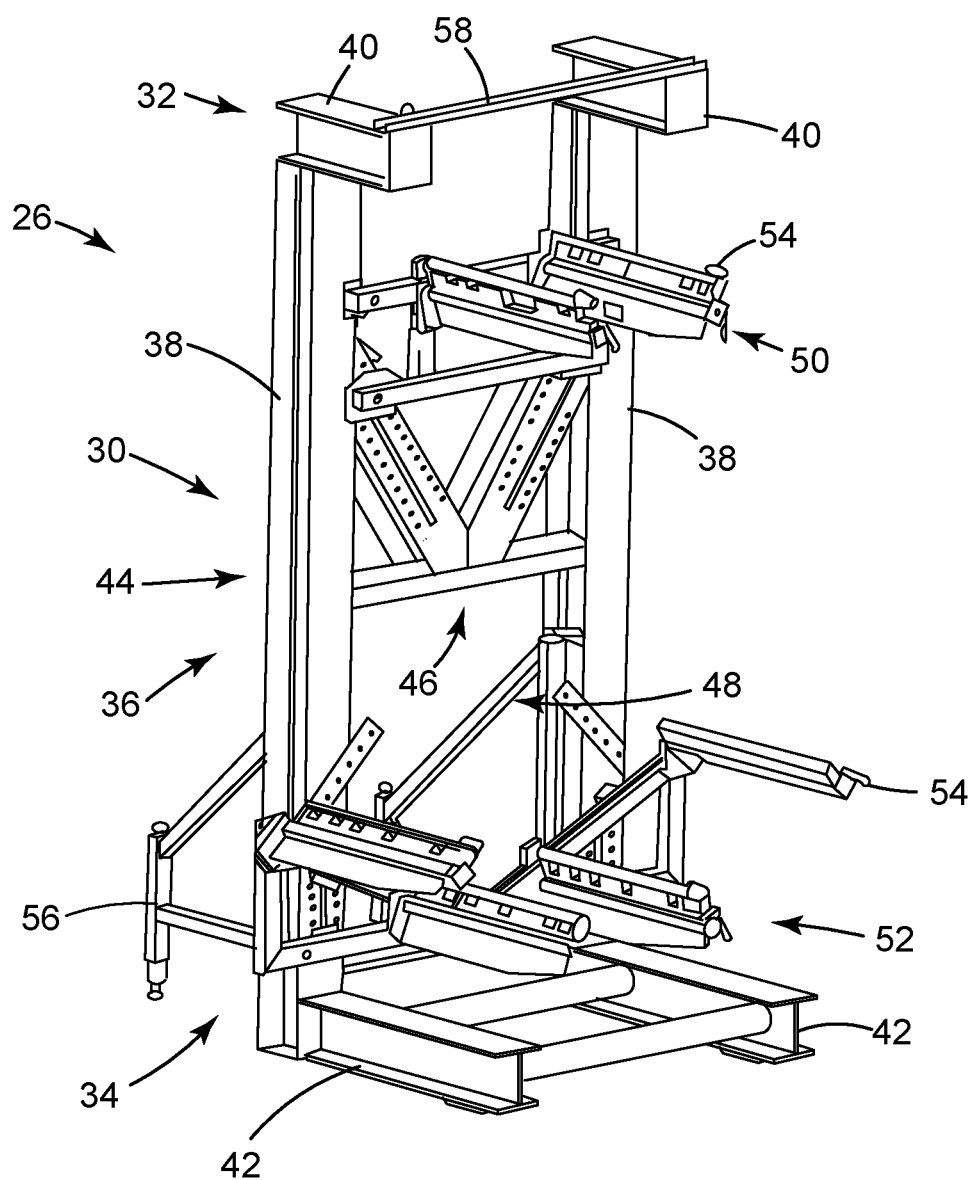
FIG. 4 is a schematic showing a more detailed view of the phase ring loading tool according to an embodiment of the present invention.
Figure 6:
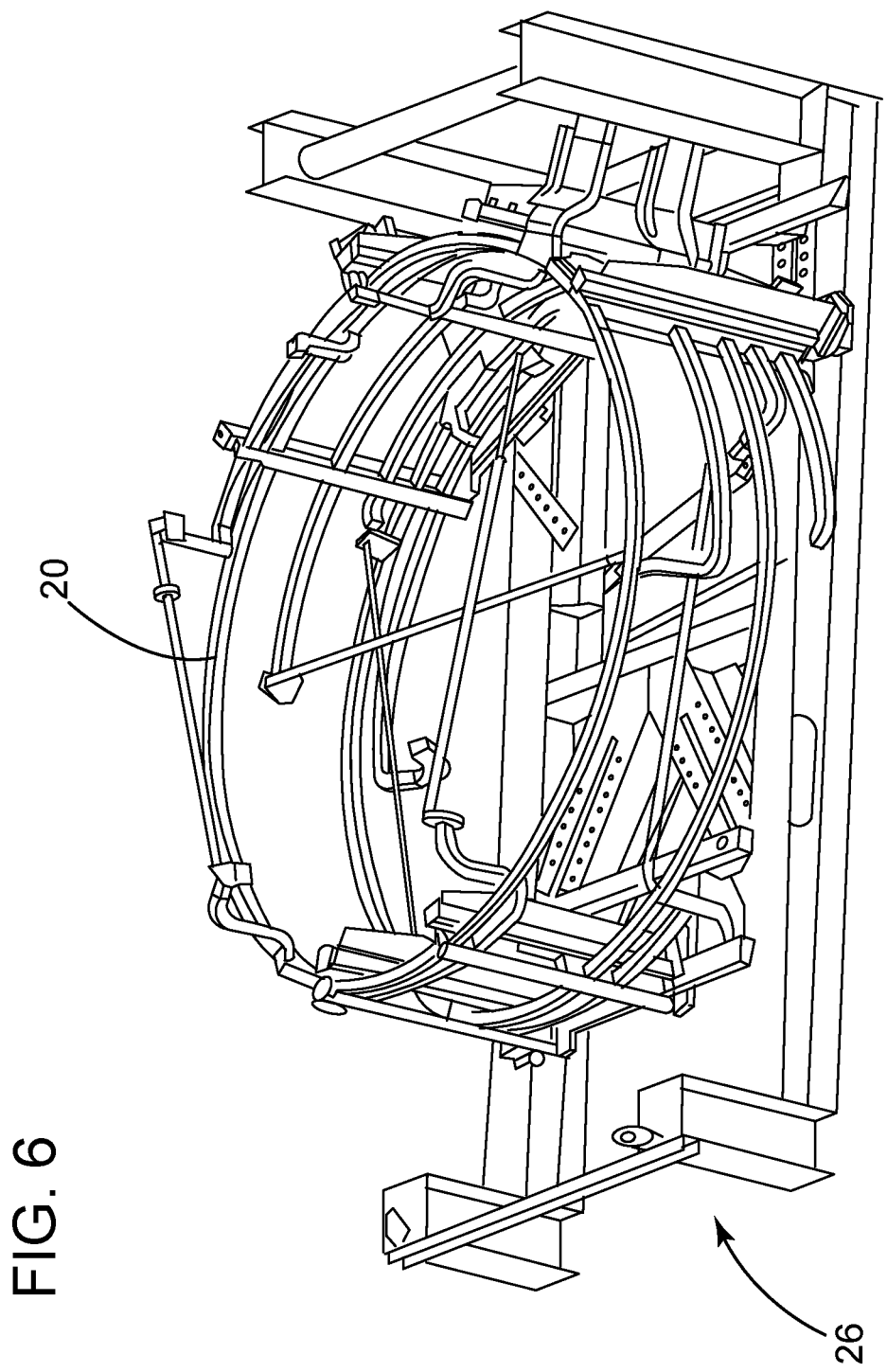
FIG. 6 is a schematic showing the phase ring loading tool in a horizontal orientation configured to receive phase rings according to an embodiment of the present invention.
Figure 7:
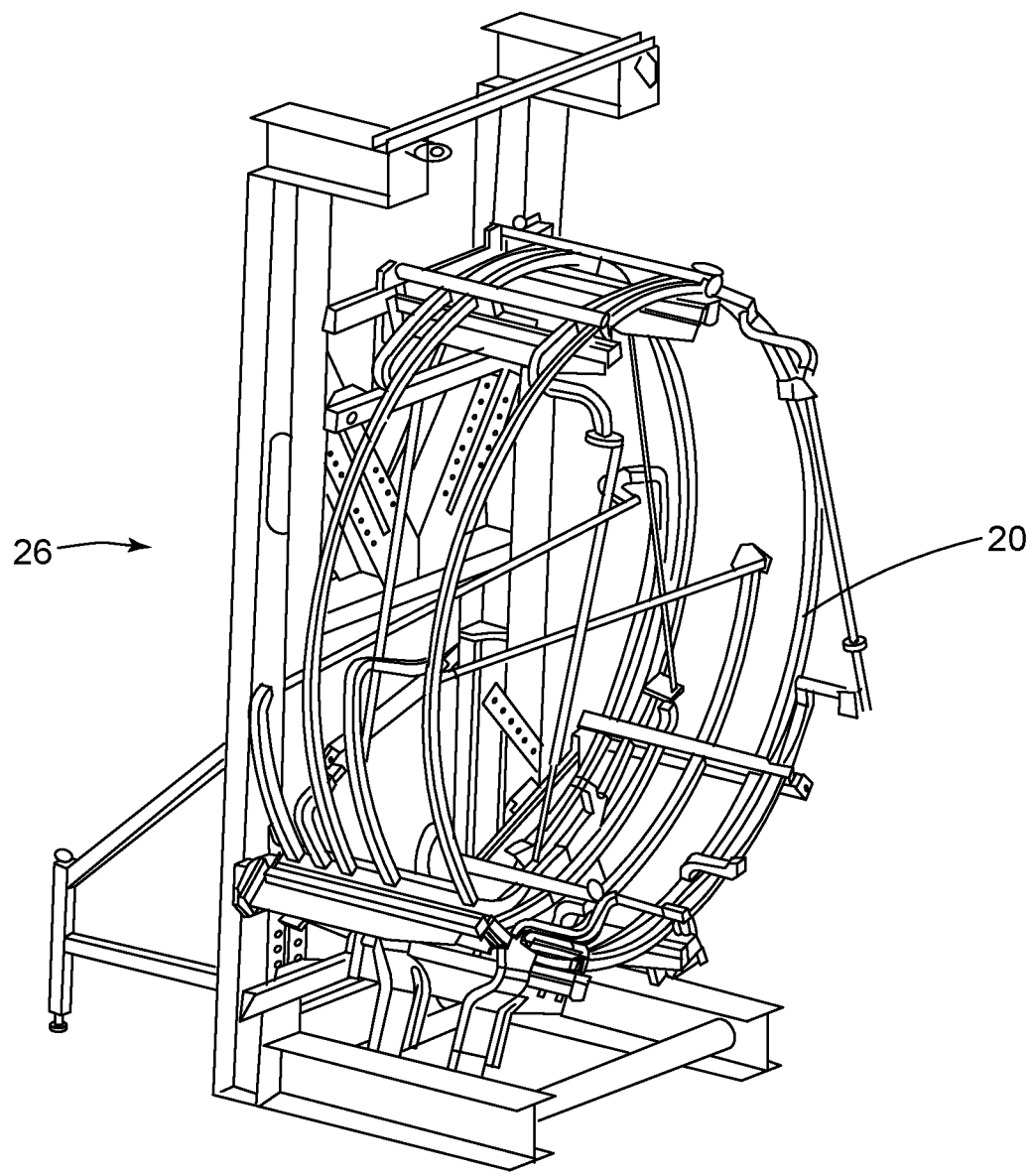
FIG. 7 is a schematic showing the phase ring loading tool depicted in FIG. 4 with phase rings in vertical orientation configured for the removal of the phase rings according to an embodiment of the present invention.

FIG. 4 is a schematic showing a more detailed view of the phase ring loading tool 26 that according to an embodiment of the present invention can be configured to receive one or more phase rings. As shown in FIG. 4, the phase ring loading tool 26 can include a frame structure 30 having a first end part 32, a second end part 34, and a middle part 36 between the first end part and the second end part. The frame structure 30 can have spaced beams 38 extending from the first end part 32 to the second end part 34. A first end protruding beam 40 can extend outward from each of the spaced beams 38 at the first end part 32 and a second end protruding beam 42 can extend outward from each of the spaced beams 38 at the second end part 34. As shown in FIG. 4, the first end protruding beams 40 can have a stabilization brace 58 that provides stability to the beams 40. To this extent, the stabilization brace 58 can provide more stability at the first end part 32 of the frame structure 30 in order to ensure that the phase ring loading tool 26 can even better support the weight of the phase rings 20. In addition, the stabilization brace 58 can also provide stabilization to any phase rings 20 placed on the phase ring loading tool 26 whether in a vertical orientation as shown in FIGS. 4 and 7, or in a horizontal position during which the rings can be loaded onto the tool as shown in FIG. 6.

The frame structure 30 can further include a truss assembly 44 in the middle part 36 to provide improved geometric stability to the spaced beams 38 extending from the first end part 32 to the second end part 34 and the protruding beams 40 and 42 at the first end part 32 and the second end part 34, respectively. In one embodiment, the truss assembly 44 can include a first truss 46 between the first end part 32 and the middle part 36, and a second truss 48 between the middle part 36 and the second end part 34. A first arm bracket support assembly 50 can be coupled with the first truss 46 and a second arm bracket support assembly 52 can be coupled with the second truss 48. The first arm bracket support assembly 50 and the second arm bracket support assembly 52 can each include arms 54 that protrude outward from the spaced beams 38. In this manner, the first arm bracket support assembly 50 and the second arm bracket support assembly 52 can provide support to one or more phase rings 20 that can be received by the phase ring loading tool 26.

In one embodiment as shown in FIG. 4, the first arm bracket support assembly 50 can include two arms 54 spaced at a predetermined distance and the second arm bracket support assembly 52 can include four arms 54 spaced at a predetermined distance, with some of the arms positioned at different heights. The number of arms 54 in the first arm bracket support assembly 50 and the second arm bracket support assembly 52 are not meant to be limiting. It is understood that more arms 54 and maybe less arms can be deployed with the first arm bracket support assembly 50 and the second arm bracket support assembly 52. Likewise, the positioning of the arms 54 in both bracket support assemblies 50, 52 can be varied.

Figure 5:
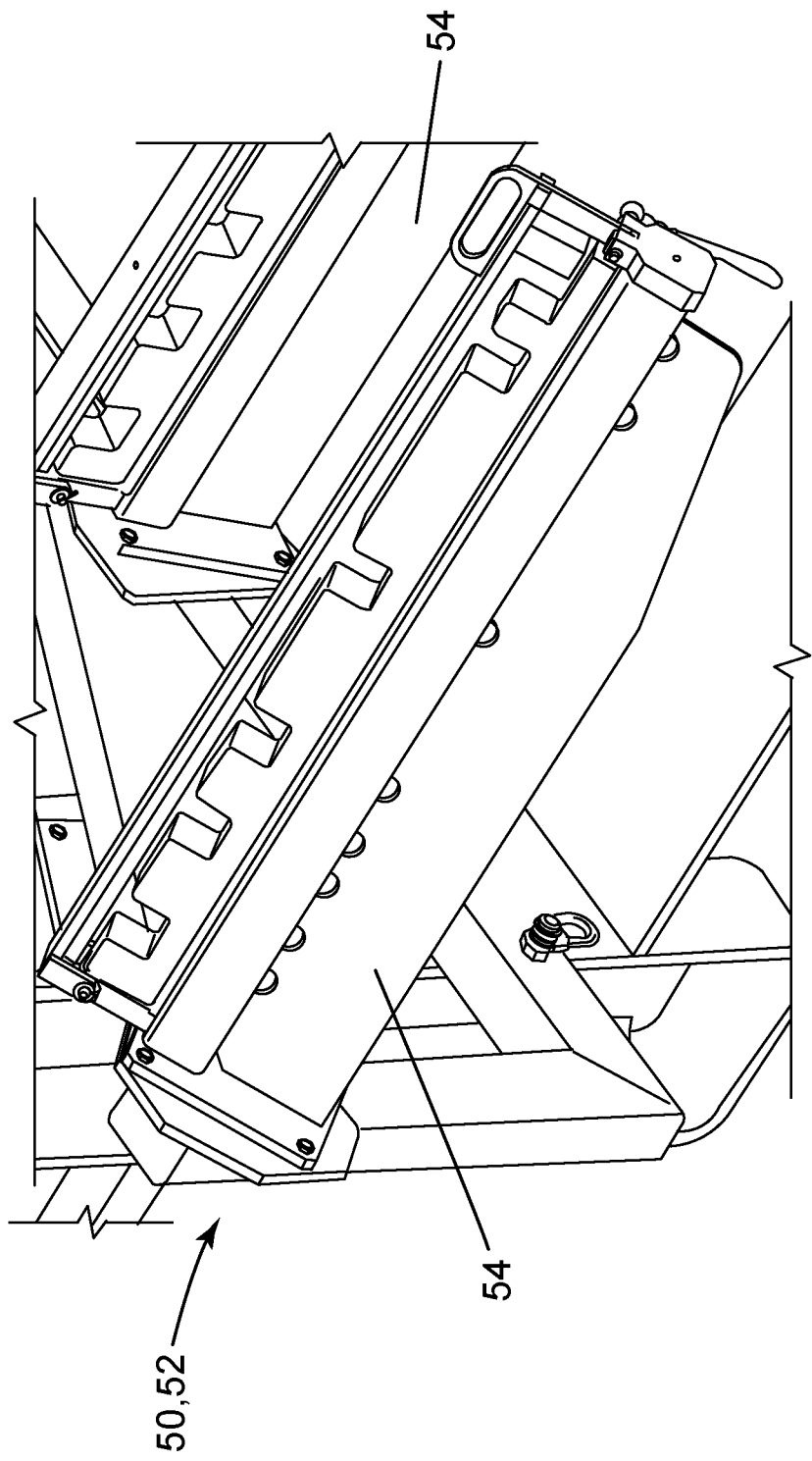
FIG. 5 is a schematic showing further details of an arm bracket support assembly of the phase ring loading tool depicted in FIG. 4 according to an embodiment of the present invention.

FIG. 5 shows a further details of the arms 54 that can be utilized in the arm bracket support assemblies 50, 52 of the phase ring loading tool 26. In one embodiment, the arms 54 can be configured as arms that are tiltable to one of a number of positions with respect to the frame structure 30. In addition, the arms 54 can be configured with a locking system to keep the position of the arms locked in placed for receiving the phase rings 20.

The phase ring loading tool 26 can include other components that improve its capabilities to receive and support one or more phase rings for installation in a generator. For example, as shown in FIG. 4, the phase ring loading tool 26 can include support legs 56 located about the second end part 34 and the middle part 36 of the frame structure 30. In one embodiment, the support legs 56 can be retractable in relation to the spaced beams 38. In this manner, the support legs 56 can extend outward from the spaced beams 38 when the phase ring loading tool 26 is oriented in a vertical orientation like that depicted in FIGS. 4 and 7. Alternatively, the support legs 56 can retract inward to lie flush with the spaced beams 38 when the phase ring loading tool 26 is oriented in a horizontal orientation which is typically the orientation of the phase ring loading tool 26 when it going to receive the phase rings.

Figure 8:
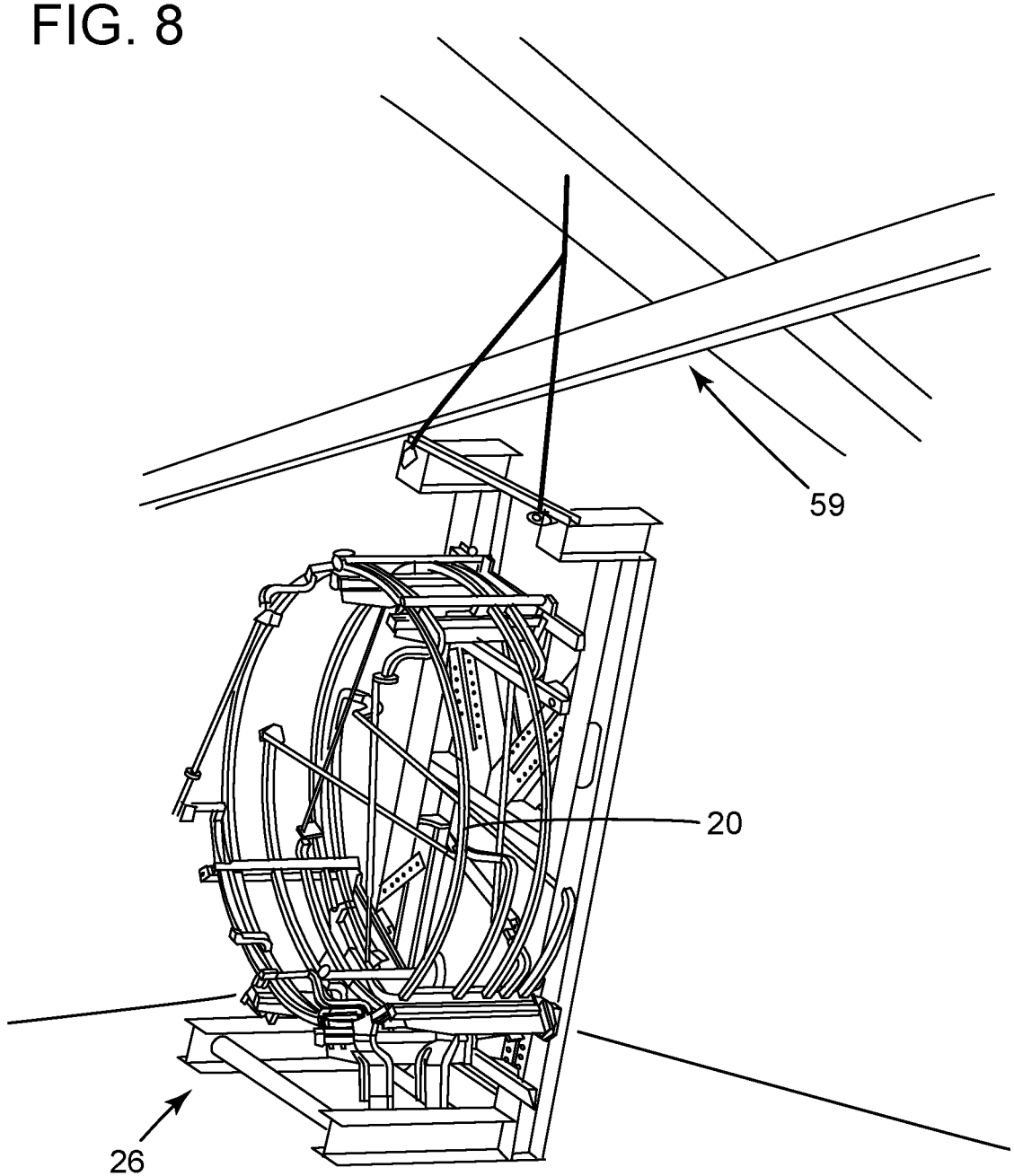
FIG. 8 is a schematic showing the phase ring loading tool being tilted to a vertical orientation for subsequent removal of phase rings therefrom by the phase ring handling tool according to an embodiment of the present invention.

In order to move the phase ring loading tool 26 with the phase rings 20 loaded thereon from the horizontal orientation to the vertical orientation in which the phase rings can be removed by the phase ring handling tool 24, the phase ring loading tool 26 can be tilted from the horizontal position to the vertical position. The phase ring loading tool 26 with the phase rings 20 loaded thereon can be tilted from the horizontal position to the vertical position by any of a number of industrial machinery configured for lifting heavy objects. For example, in one embodiment as shown in FIG. 8, the phase ring loading tool 26 with the phase rings 20 loaded thereon can be tilted from the horizontal position to the vertical position by a crane 59 equipped with a hoist and supporting equipment such as, for example, wire ropes, chains and sheaves.

There are several advantages associated with the phase ring handling tool 24. For example, with the configuration as described, the phase ring handling tool 24 can hold up to six phase rings. In addition, using the phase ring handling tool 24 to preload the phase rings allows workers to visually inspect the phase rings to see if there are any quality issues before initiating the installation. In this manner, if issues exist with regard to the phase rings, then they can be addressed prior to the installation and not while the generator is offline. As a result, an unnecessary outage of the generator can be avoided.

Figure 9:
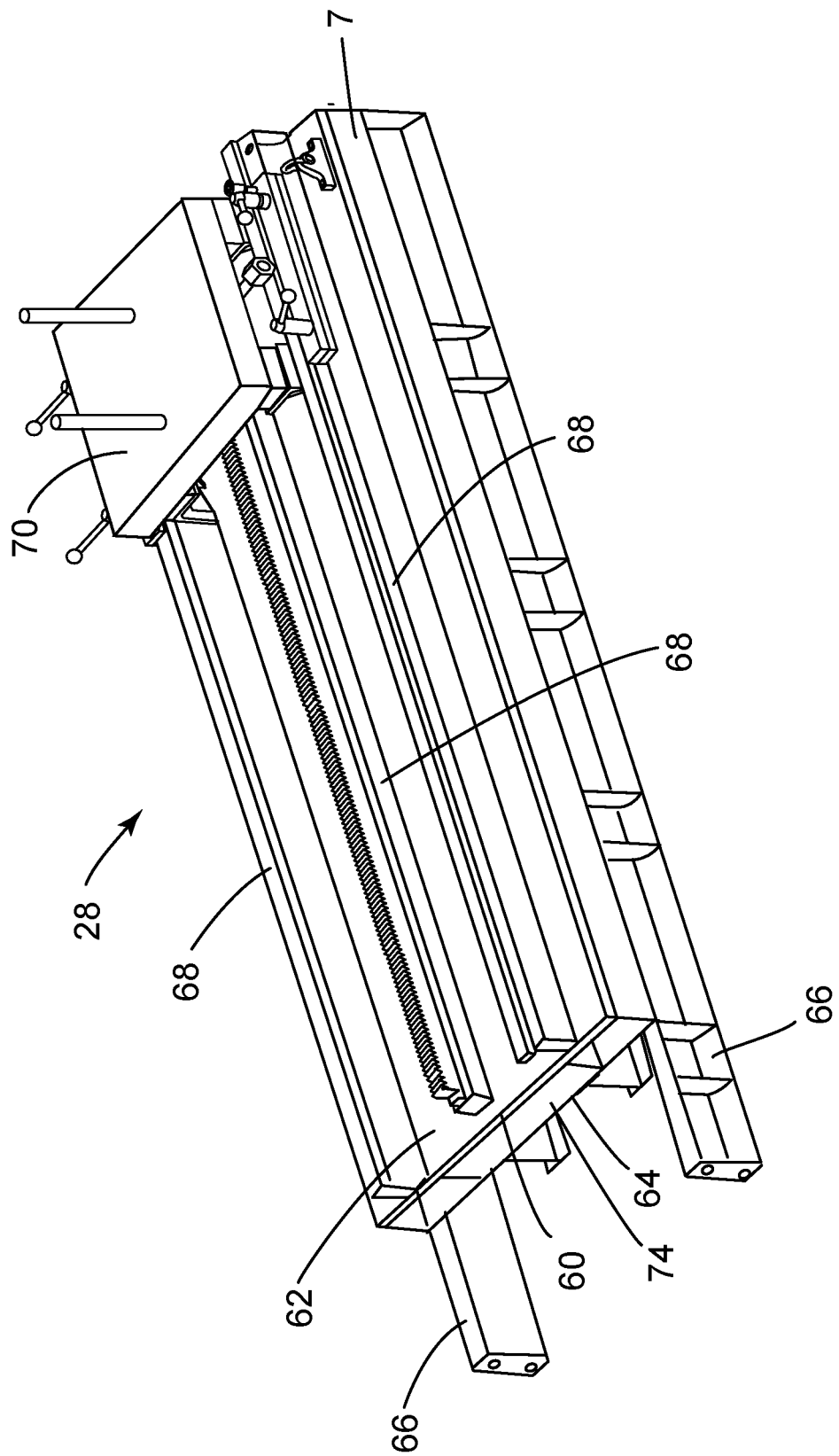
FIG. 9 is a schematic showing further details of the base loader depicted in FIGS. 2 and 3 according to an embodiment of the present invention.

Turning the discussion now to the base loader 28 mentioned in regard to FIGS. 2 and 3. FIG. 9 shows a more detailed view of the base loader 28 that according to embodiments of the present invention can be operative to facilitate both loading of the phase rings 20 with the phase ring loading tool 26 and installing or removing the phase rings in the electric generator 12 with the phase ring handling tool 24. As shown in FIG. 9, the base loader 28 can include a platform 60 having a top side 62 and a bottom side 64. A plurality of bottom side beams 66 can be coupled to the bottom side 64 of the platform 60. A plurality of rails 68 can be coupled to the top side 62 of the platform 60. A phase ring handling tool carriage 70 can be configured to receive the phase ring handling tool 24 and travel along the plurality of rails 68 with the phase ring handling tool 24 thereon. Although not depicted in FIG. 9, bearings can be used in conjunction with the rails 68 to facilitate travel of the phase ring handling tool carriage 70 and the phase ring handling tool 24 along the rails.

As shown in FIG. 9, the plurality of bottom side beams 66 can comprise two beams spaced apart from each other and located on a middle part of the platform 60 extending from a first end 72 of the bottom side 64 of the platform 60 to a second end 74 of the bottom side 64 of the platform 60. The two beams 66 that are located in the middle part of the platform 60 can each have ends that are vertically in alignment with the first and second ends 72, 74 of the bottom side 64 of the platform 60. FIG. 9 also shows that the plurality of bottom side beams 66 can further comprise two outer beams enclosing the two beams located on the middle part of the bottom side 64 of the platform 60. In one embodiment, the two outer beams 66 can extend from the first end 72 of the bottom side 64 of the platform 60 to the second end 74 of the bottom side 64 of the platform 60. To this extent, one end of both of the outer beams 66 can extend beyond one of the first and second ends 72, 74 of the bottom side 64 of the platform 60. With this configuration, the ends of the outer beams 66 that extend beyond one of the first and second ends 72, 74 of the bottom side 64 of the platform 60 can be configured for operative engagement with the phase ring loading tool 26, while the opposing ends of the outer beams 66 on the bottom side 64 of the platform 60 can be configured to receive an industrial vehicle 76, like for example a forklift that is depicted in FIGS. 2 and 3, that is operative to transport the base loader 28 and the phase ring handling tool 24 when placed on the loader to a position that is adjacent the phase ring loading tool 26 and the electric generator 12. In one embodiment, the first end 72 of the bottom side 64 of the platform 60 can receive the industrial vehicle 76, while the second end 74 of the bottom side 64 of the platform 60 can be placed adjacent to the phase ring loading tool 26 to facilitate removal of the phase rings 20 thereon.

Figure 10:
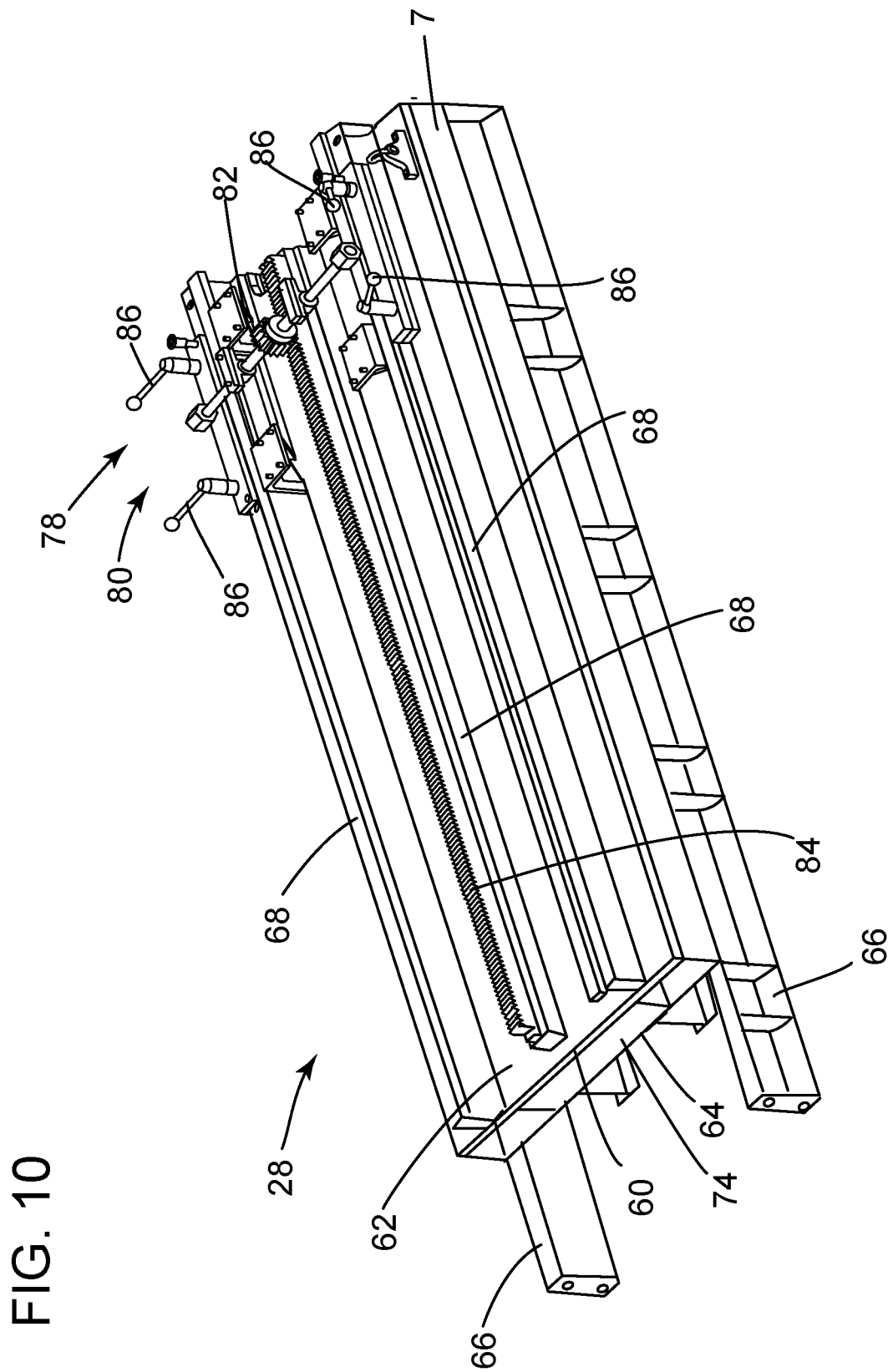
FIG. 10 is a schematic showing further details of the base loader depicted in FIG. 9 without the phase ring handling tool carriage according to an embodiment of the present invention.
Figure 11:
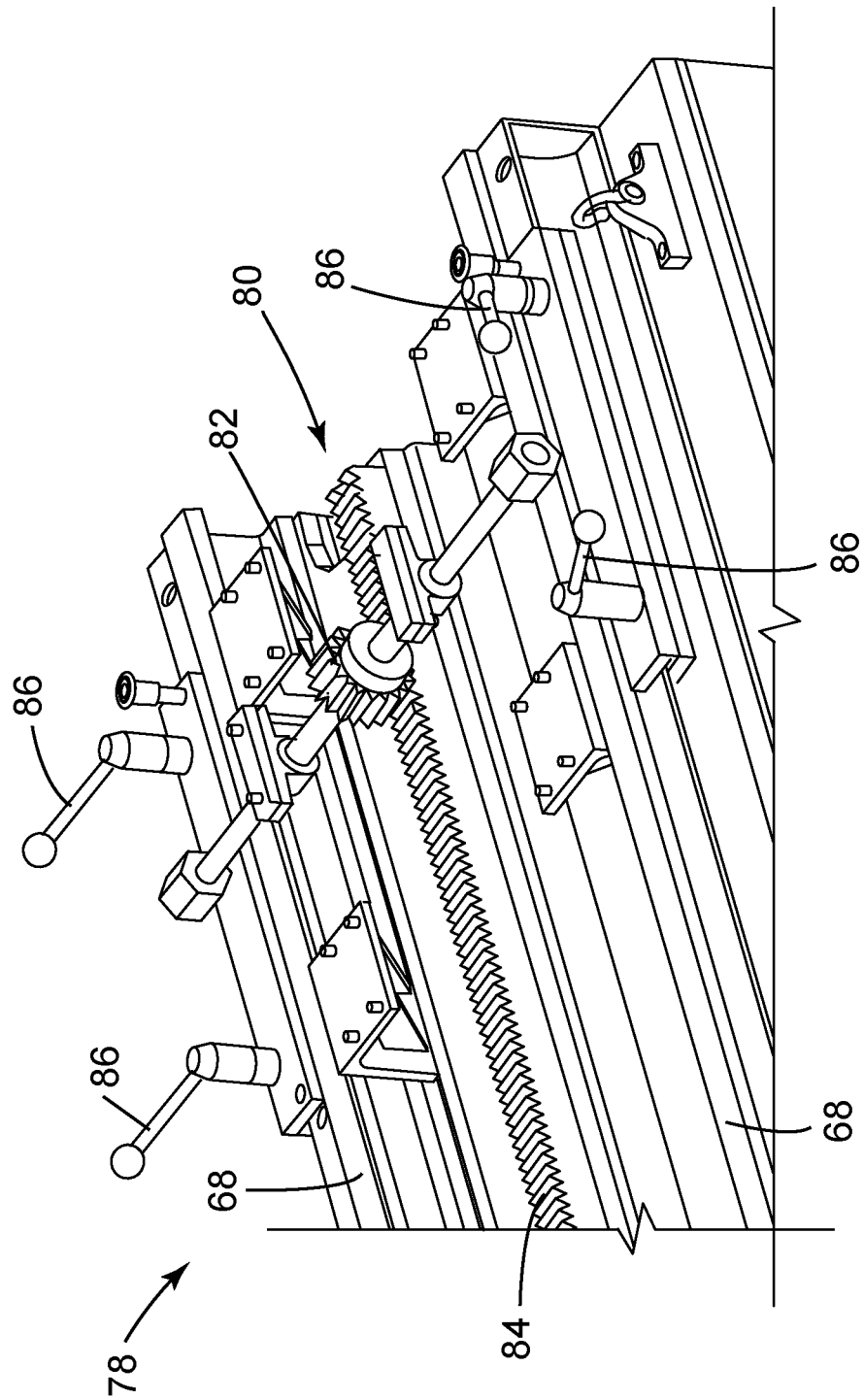
FIG. 11 is a schematic showing a more detailed view of a fixed pinion rack system that is configured to facilitate translation of the phase ring handling tool carriage along the rails depicted in FIGS. 9 and 10 according to an embodiment of the present invention.
Figure 12:
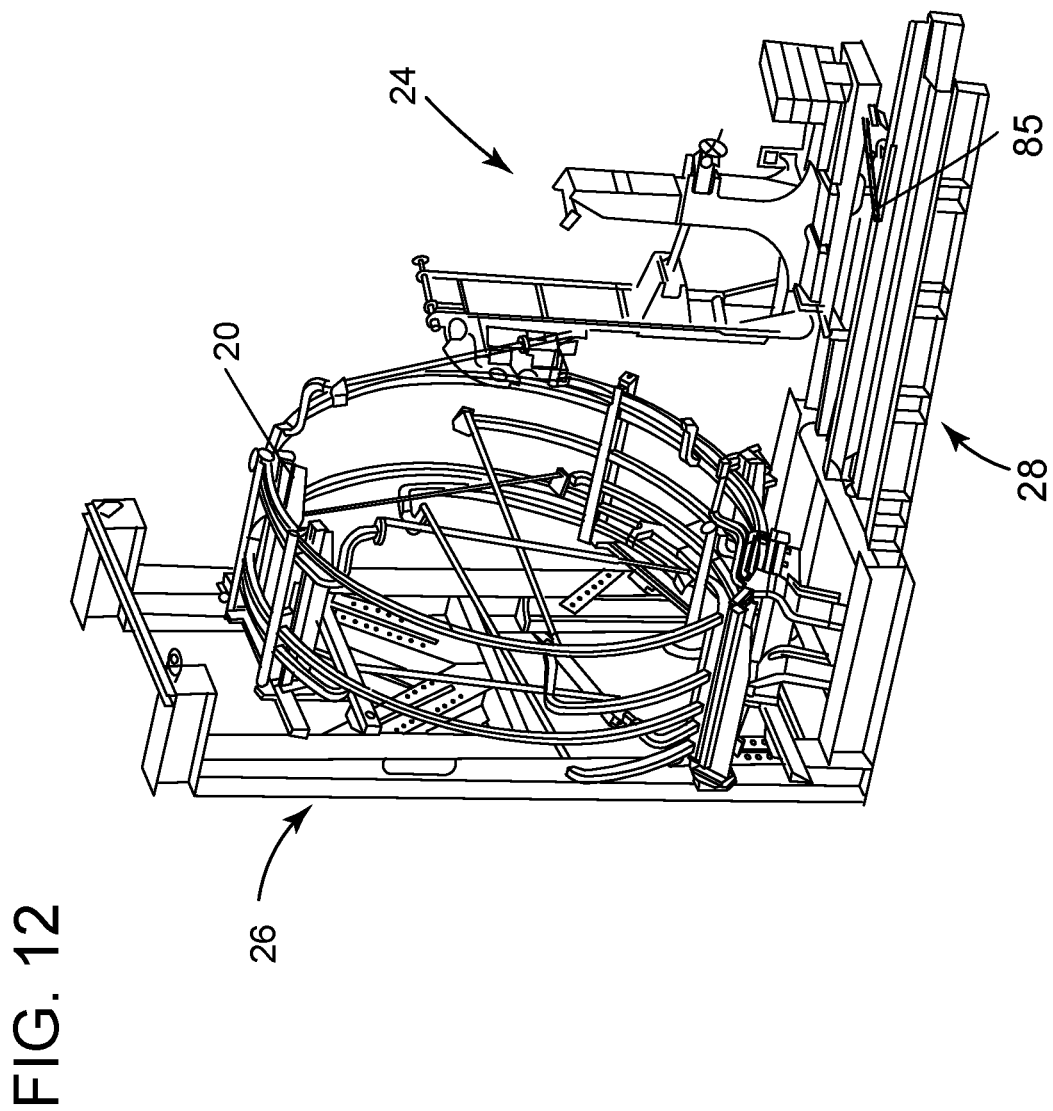
FIG. 12 is a schematic showing the phase ring handling tool in position for removing phase rings from the phase ring loading tool after tilted to a vertical orientation according to an embodiment of the present invention.

FIGS. 10 and 11 show details of a trolley system 78 that can be utilized with the base loader 28 to translate the phase ring handling tool carriage 70 in the fore and aft direction. In particular, FIG. 10 shows the base loader 28 depicted in FIG. 9 without the phase ring handling tool carriage 70 to provide a view of more elements of the trolley system 78, while FIG. 11 shows the trolley system 78 in more detail. In one embodiment, as depicted in FIGS. 10 and 11, the trolley system 78 can comprise a fixed pinion rack system 80 that is configured to facilitate translation of the phase ring handling tool carriage 70 along the rails 68. FIGS. 10 and 11 show that the fixed pinion rack system 80 can include a pinion 82 that is operative to engage with a rack 84. In operation, the teeth of the pinion 82 mesh with the rack 84 such that rotational motion of the pinion 82 translates into linear motion along the rack 84. Concomitantly, driving the rack 84 linearly will cause the pinion 82 to be driven into a rotation. Although not illustrated in FIGS. 10 and 11, rotation of the pinion 82 along the rack 84 can be attained through the use of any of a number of actuating devices. One example of an actuating device that can be used to facilitate the interaction between the pinion 82 and the rack 84 is a ratchet wrench 85 which is depicted in FIG. 12. To this extent, the phase ring handling tool carriage 70 and the phase ring handling tool 24 when placed on the base loader 28 can be translated in the fore and aft direction by depressing on the ratchet wrench to impart a motion in either the fore or aft direction.

Referring back to FIGS. 10 and 11, in order to facilitate the use of the base loader 28 with the phase ring handling tool 24 and the phase ring loading tool 26, the base loader 28 can be configured with a plurality of locking pins 86 that can be adjusted to keep the phase ring handling tool carriage 70 locked in place in a rear position. This feature is beneficial during transportation and handling of the base loader 28.

The base loader 28 as depicted and described with respect to FIGS. 9-11 has utility with both the phase ring handling tool 24 and the phase ring loading tool 26. In one embodiment as shown in FIG. 12, the base loader 28 can be placed adjacent to a vertically oriented phase ring loading tool 26 for facilitating the removal of the phase rings 20 by the phase ring handling tool 24. For example, the base loader 28 can be placed adjacent to the phase ring loading tool 26 by an industrial vehicle 76 (not shown in FIG. 12). The industrial vehicle 76 can then carry the phase ring handling tool 24 to the base loader 28 so that it can be positioned to travel along the rails 68 of the platform 60 of the base loader. In this manner, the phase ring handling tool 24 can be moved in a position that is close enough to remove the phase rings 20 from the phase ring loading tool 26. It is understood, that depending on the industrial vehicle 76, it may be possible to position the base loader 28 with the phase ring handling tool 24 already positioned on the rails 68 in order to speed up the process. Regardless, the phase ring handling tool 24 can then remove the phase rings 20 from the phase ring loading tool 26. With the phase rings 20 removed from the phase ring loading tool 26, the industrial vehicle 76 can then be deployed to position the base loader 28 and the phase ring handling tool 24 with the phase rings 20 in a location for loading and installing the rings in a generator 12 like that depicted in FIG. 3. In another embodiment, the base loader 28 and the phase ring handling tool 24 can be moved to a position adjacent the generator 12 to facilitate the removal of used phase rings from the generator.

Figure 13:
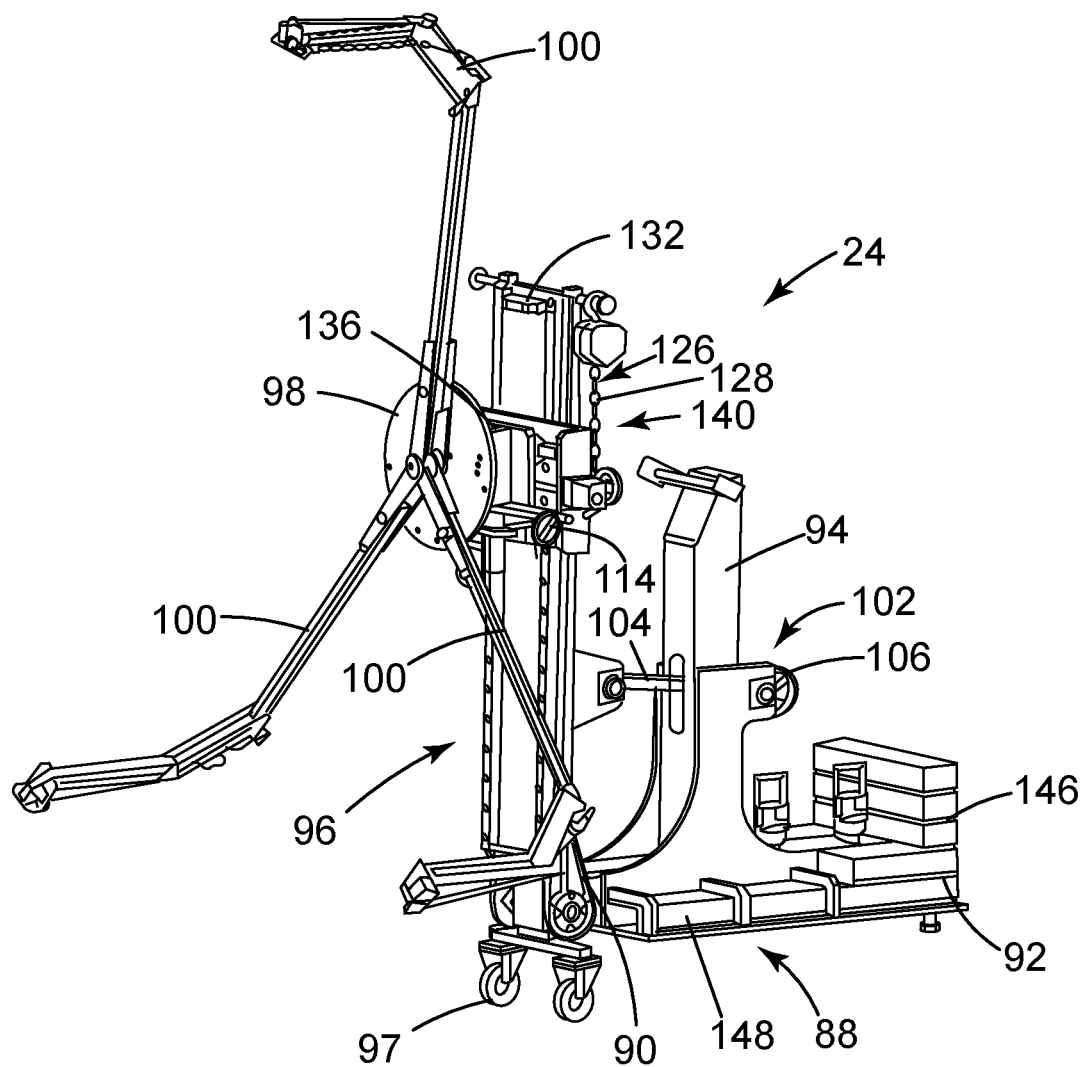
FIG. 13 is a perspective schematic view showing the phase ring handling tool according to an embodiment of the present invention.
Figure 14B:
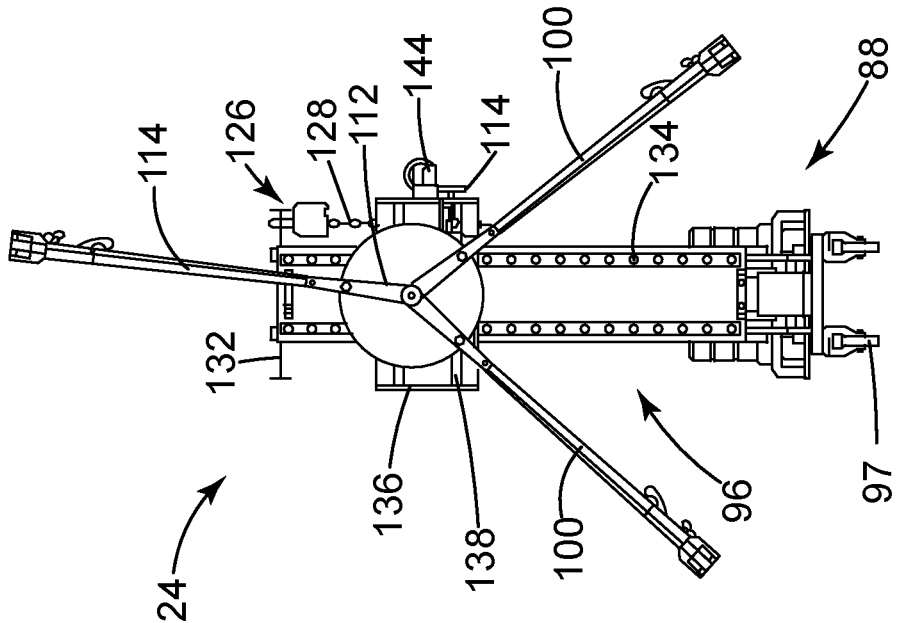
FIGS. 14A and 14B show a side elevational view and a front elevational view, respectively, of the phase ring handling tool according to an embodiment of the present invention.
Figure 14A:
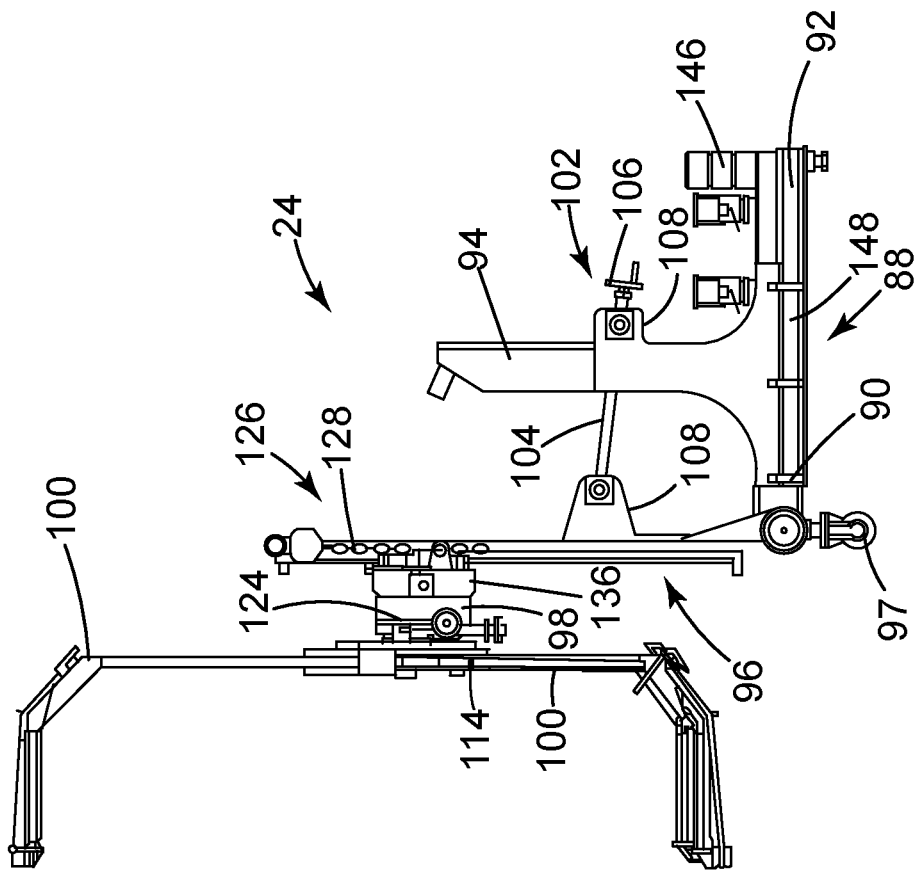

Turning the discussion now to details of the components of the phase ring handling tool 24 that enable it to remove phase rings 20 from the phase ring loading tool 26 and facilitate installation of the rings with a generator 12, or removal of used rings from the generator, while operating in conjunction with the base loader 28. For example, FIG. 13 shows a perspective view of some of the components that can form the phase ring handling tool 24, while FIGS. 14A and 14B show a side elevational view and a front elevational view, respectively, of the phase ring handling tool and its components. As shown in FIGS. 13 and 14A, the phase ring handling tool 24 can include a base unit 88 configured to move in a fore and aft direction. The base unit 88 can have a front end part 90, a back end part 92, and a vertical extending part 94 between the front end part 90 and the back end part 92 to provide stabilization between the front and back end parts. A vertical support structure 96 with a set of wheels 97 on a bottom end portion of the vertical support structure 96 can be coupled to the base unit 88 at the front end part 90 and the vertical extending part 94 of the base unit 88. The wheels 97 can facilitate the axial movement of the vertical support structure 96 with the base unit 88.

The phase ring handling tool 24 can further include a phase ring support head 98 coupled to the vertical support structure 96 that can support a plurality of support arms 100 as shown in FIGS. 13, 14A, 14B and 19. The phase ring support head 98 can be configured to move in relation to the vertical support structure 96 and the vertical extending part 94 of the base unit 88, and the plurality of support arms 100 can be configured to support one or more electric generator phase rings 20 during operation of the phase ring handling tool 24.

The phase ring handling tool 24 of FIGS. 13, 14A and 14B can be configured to move through up to five degrees of movement to facilitate the installation and removal of phase rings in the electric generator. One of those degrees of movement includes motion of the base unit 88 in the fore and aft direction. As mentioned previously, the phase ring handling tool 24 can be placed on the phase ring handling tool carriage 70 of the base loader 28. The phase ring handling tool carriage 70 with the phase ring handling tool 24 thereon can travel along the plurality of rails 68 of the base loader 28. The trolley system 78 of the base loader 28 which can include the fixed pinion rack system 80 can facilitate translation of the phase ring handling tool 24 and the phase ring handling tool carriage 70 along the rails 68 in the fore and aft direction by depressing on an actuating device such as a ratchet wrench that drives axial translation.

Another degree of movement that the phase ring handling tool 24 can undergo is tilting along a horizontal axis. For example, the vertical support structure 96, the phase ring support head 98, and the plurality of support arms 100 can be tilted along a horizontal axis either towards or away from the vertical extending part 94 of the base unit 88 of the phase ring handling tool 24. In one embodiment, a screw drive system 102 can be operatively coupled to the vertical support structure 96 and the vertical extending part 94 of the base unit 88 to effect the tilting movement of the vertical support structure 96, the phase ring support head 98, and the plurality of support arms 100. The screw drive system 102 can comprise a screw 104 coupled to the vertical support structure 96 and the vertical extending part 94 of the base unit 88, and a hand wheel 106 configured to drive the screw 104 to translate movement of the vertical support structure 96 in relation to the vertical extending part 94 of the base unit 88 such that the vertical support structure 96, the phase ring support head 98, and the plurality of support arms 100 that are coupled to vertical support structure 96 can tilt either towards or away from the vertical extending part 94.

Figure 15:
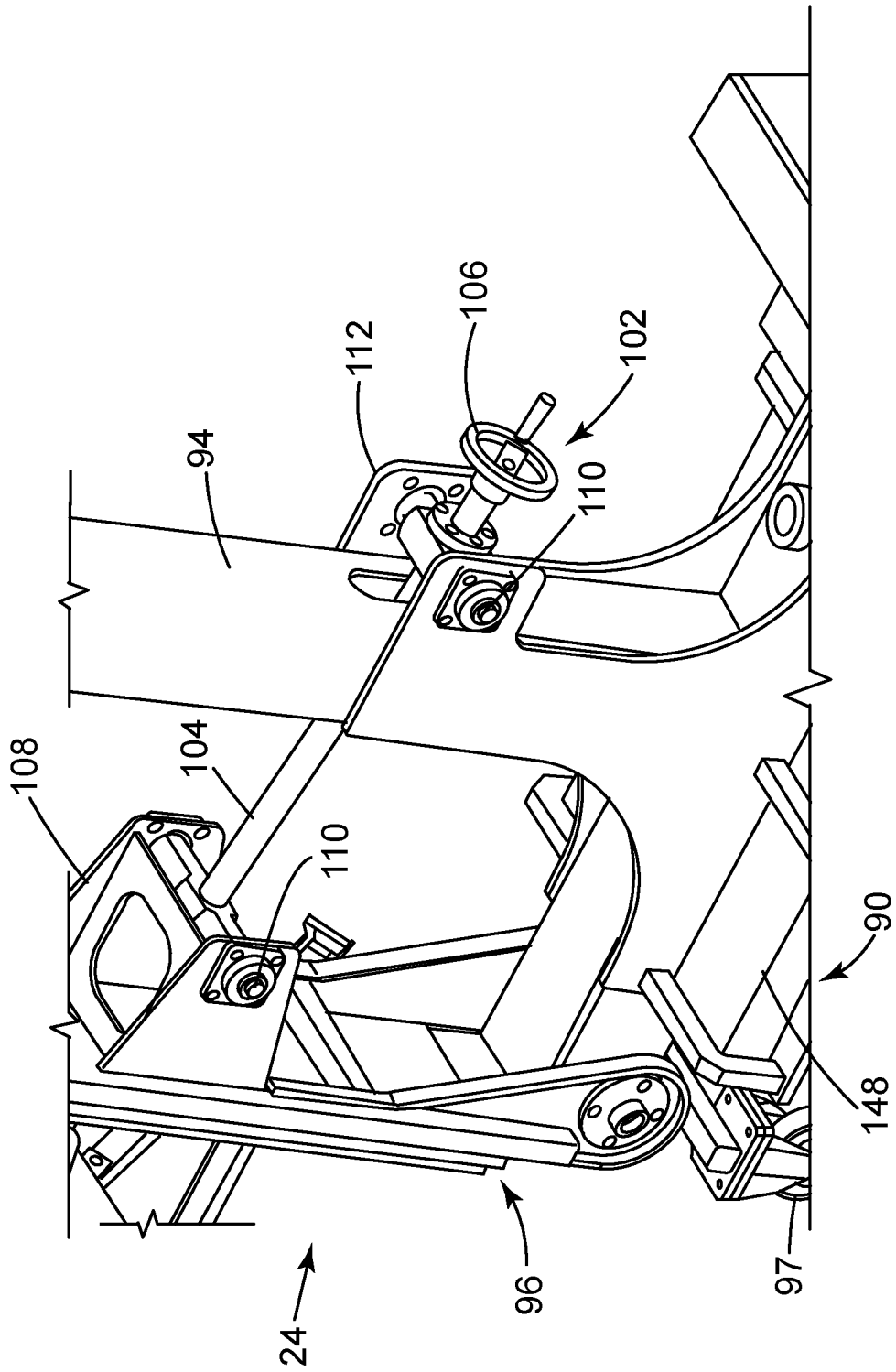
FIG. 15 is a more detailed view of a vertical extending part of the base unit and a vertical support structure of the phase ring handling tool according to an embodiment of the present invention.

FIG. 15 shows a more detailed view of the screw drive system 102 including the screw 104 and the hand wheel 106. As shown in FIG. 15, the screw 104 can be attached to the vertical support structure 96 via a screw bracket 108 that extends out from a back side of the vertical support structure 96 that is secured in place by a fastener such as for example a nut and bolt assembly 110. The opposing side of the screw 104 can be attached to the vertical extending part 94 via a screw bracket 112 that extends out from a back side of the vertical extending part 94 that is secured in place by a fastener such as for example a nut and bolt assembly 110. In operation, manually turning the hand wheel 106 causes linear motion of the screw 104 in an axial direction that results in the translation of the vertical support structure 96 to tilt in a horizontal direction either towards or away from the vertical extending part of the base unit 88. The direction that the hand wheel 106 is turned will dictate whether the vertical support structure 96 moves away from the front end part 90 of the base unit 88 or towards the front part. Tilting in this manner can be advantageous for the phase ring handling tool 24 while performing operations directed to the phase rings 20 that include inserting, adjusting, removing and picking up the rings.

Figure 16:
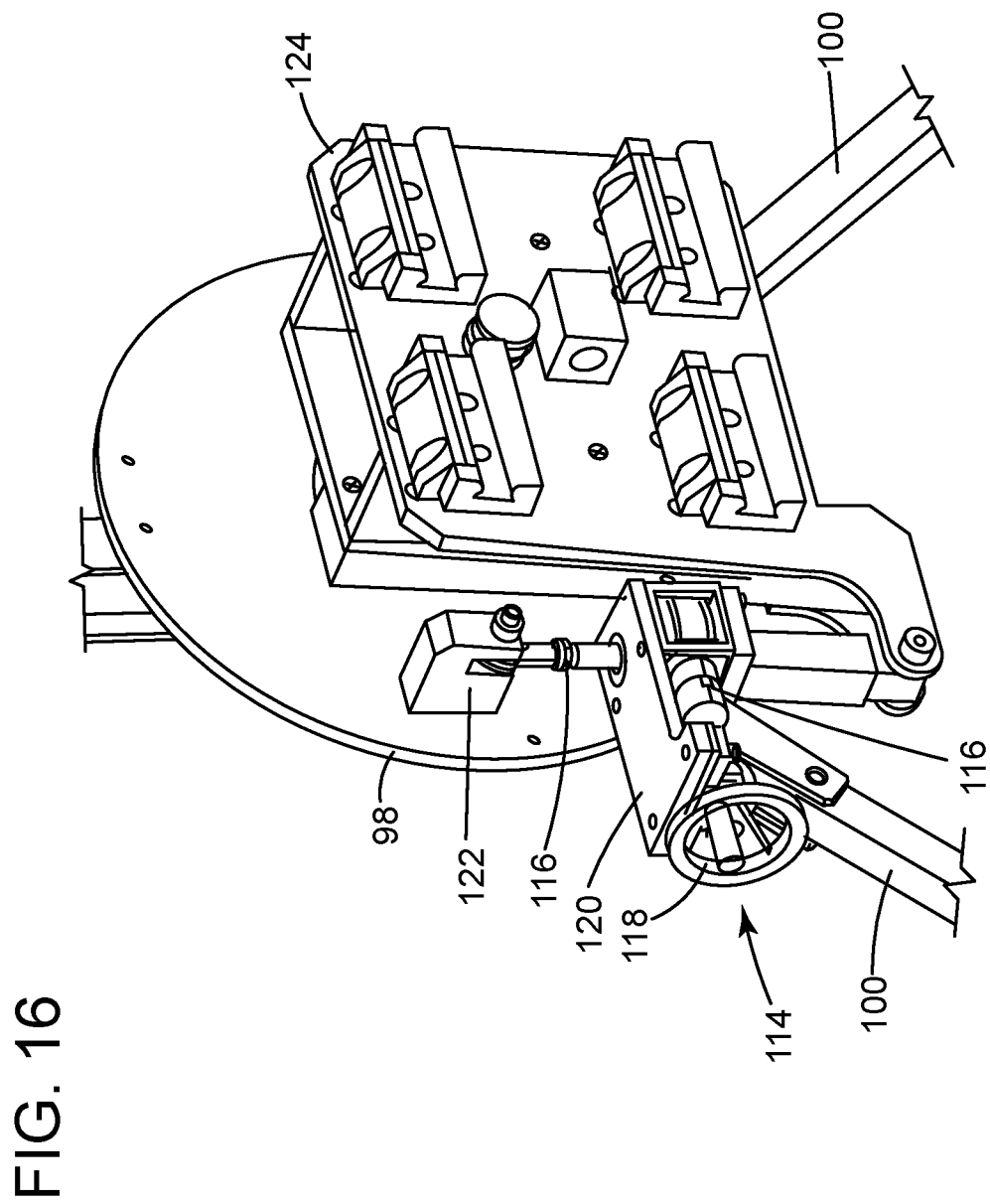
FIG. 16 is a more detailed view of a phase ring support head of the phase ring handling tool according to an embodiment of the present invention.

Rotation of the phase ring support head 98 is another degree of movement that the phase ring handling tool 24 can undertake during its operations of installing or removing phase rings in a generator. For example, FIGS. 13, 14A, 14B, and 16 show that the phase ring handling tool 24 can include a screw drive system 114 operatively coupled to the phase ring support head 98 that is configured to rotate the phase ring support head 98 in relation to the vertical extending part 94 of the base unit 88, as well as the vertical support structure 96. Details of the screw drive system 114 are shown in FIG. 16. As shown in FIG. 16, the screw drive system 114 can comprise a screw 116 coupled to the phase ring support head 98, and a hand wheel 118 configured to drive the screw 116 to rotate the phase ring support head 98 in relation to the vertical extending part 94 of the base unit 88 and the vertical support structure 96. In one embodiment, the screw drive system 114 can comprise a worm screw system with a worm gear in the form of a screw that meshes with a worm wheel. As shown in FIG. 16, the back side of the phase ring support head 98 can include a drive screw bracket 120 that secures the screw 116 and the hand wheel 118. In addition, the back side of the phase ring support head 98 can further include a drive screw rotation bracket 122 that also secures the screw 116 and the hand wheel 118 and facilitates rotation of the phase ring support head 98 in accordance with the rotative translation imparted by the hand wheel 118 and the screw 116. FIG. 16 also shows that the back side of the phase ring support head 98 can further include a mounting bracket 124 that can be used to secure a part of the screw drive system 114. As shown in FIG. 16, the part of the screw 116 that is used to impart the rotative movement of the phase ring support head 98 can be coupled to the mounting bracket 124. Having the capability to rotate the phase ring support head 98 in this manner can be advantageous for the phase ring handling tool 24 when performing operations directed to the phase rings 20 that include inserting, adjusting, removing and picking up the rings.

Figure 17:
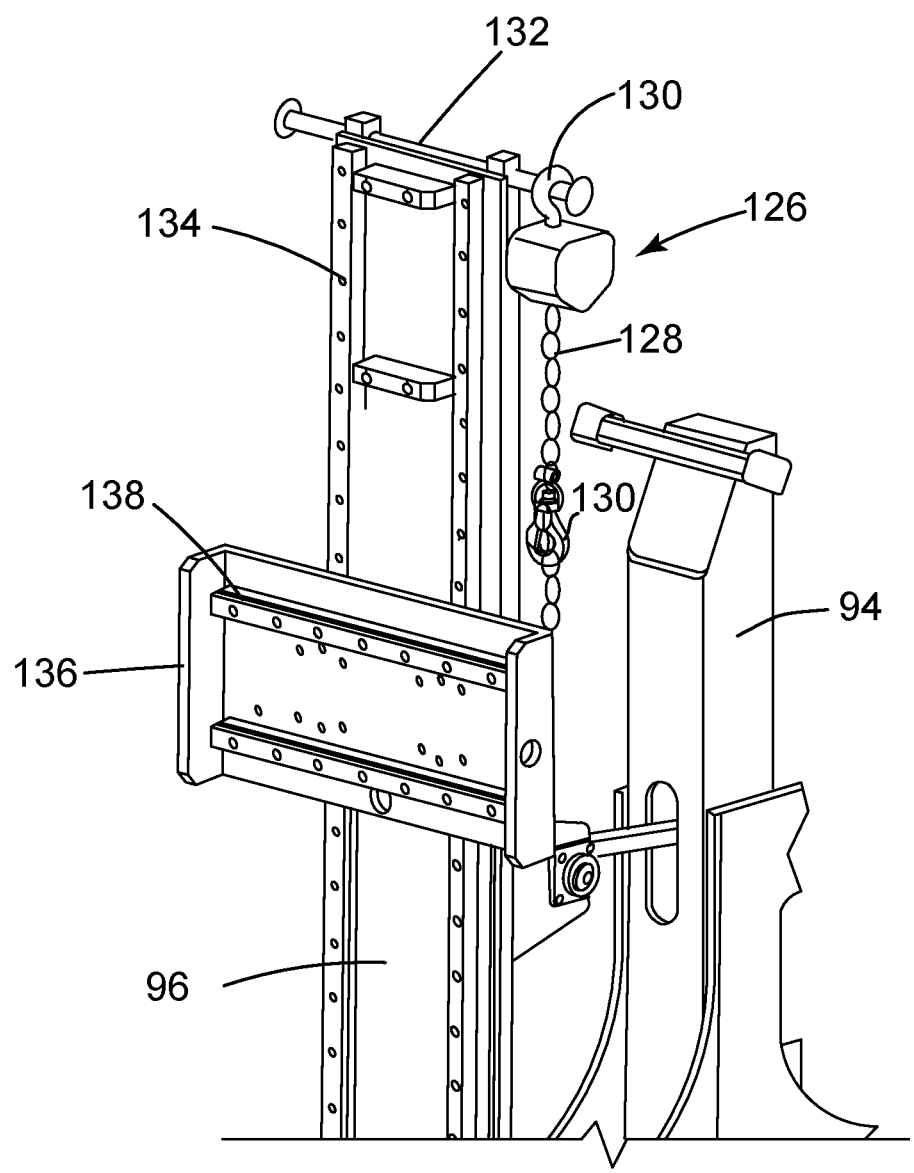
FIG. 17 is a more detailed view of the vertical support structure of the phase ring handling tool with a chain hoist assembly according to embodiments of the present invention.

Vertical displacement of the phase ring support head 98 is another degree of movement that the phase ring handling tool 24 can undertake during its operations of installing or removing phase rings in a generator. For example, FIGS. 13, 14A, 14B, and 17 show that the phase ring handling tool 24 can include a chain hoist assembly 126 configured to displace the phase ring support head 98 and support arms 100 in a vertical direction in relation to the vertical support structure 96. The chain hoist assembly 126 can include a pull chain 128 with at least one hook 130. As shown in FIG. 17, a hook 130 can be placed in an intermediary location of the pull chain 128. In addition, another hook 130 can be used to secure the chain hoist assembly 126 to a chain hoist support bar 132 that extends over a top portion of the vertical support structure 96.

The chain hoist assembly 126 can further include vertically extending spaced railings 134 disposed on the vertical support structure 96. A phase ring support head trolley 136 that secures the phase ring support head 98 thereto is configured to travel along the vertically extending spaced railings 134 with the phase ring support head and the support arms 100. The phase ring support head trolley 136 is also configured to receive the mounting bracket 124 on the back side of the phase ring support head 98 as depicted in FIG. 16. In one embodiment, the pull chain 128 is operatively coupled with the phase ring support head trolley 136. In operation, the pull chain 128 can translate the phase ring support head trolley 136 along the vertically extending spaced railings 134 in the vertical direction depending on which direction the chain is pulled. Vertically displacing the phase ring support head trolley 136 with the phase ring support head 98 and the support arms 100 secured thereto enables the phase ring handling tool 24 to facilitate performing operations directed to the phase ring 20 that include inserting, adjusting, removing and picking up the rings.

Figure 18:
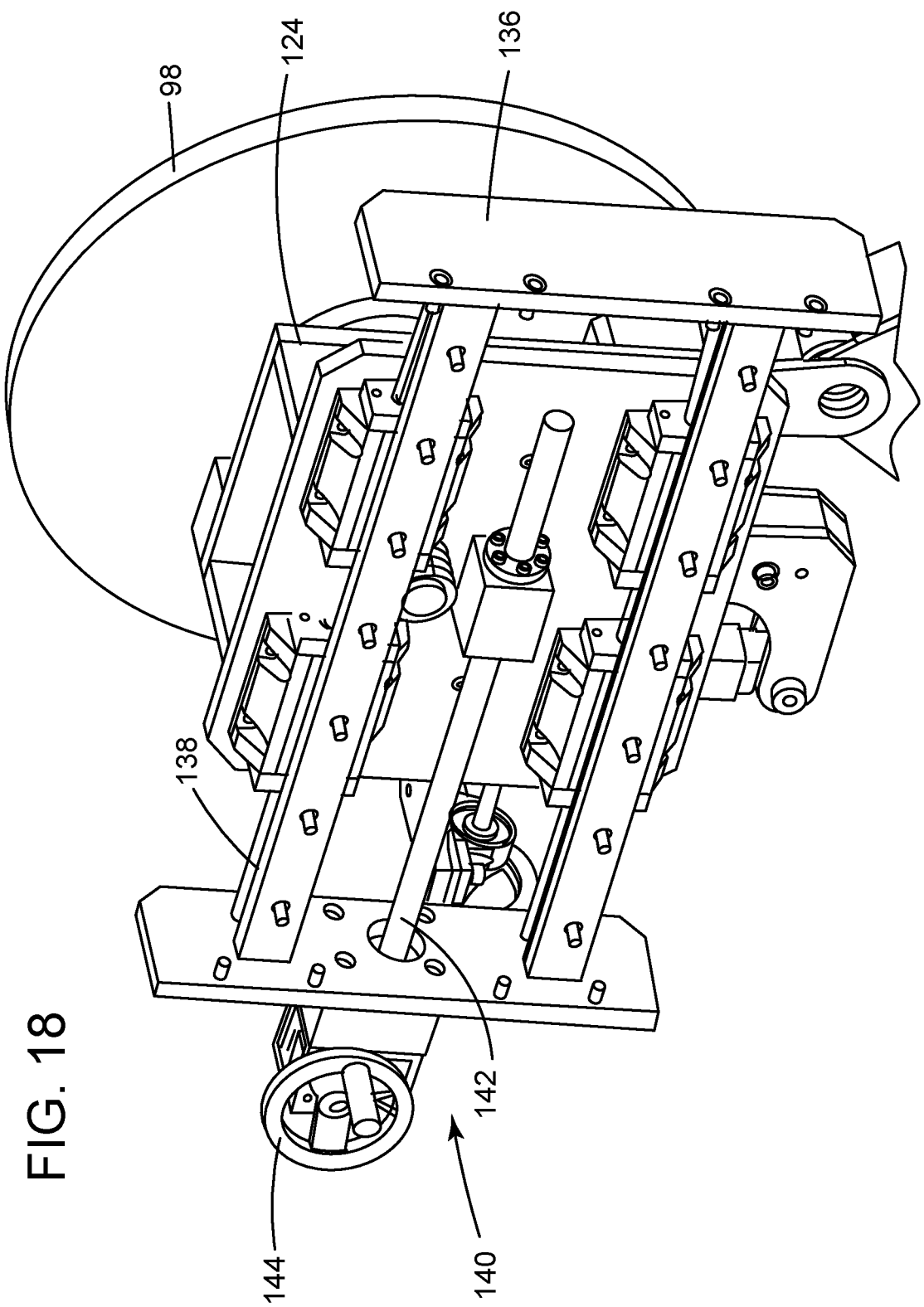
FIG. 18 is a more detailed view of the phase ring support head bracket depicted in FIGS. 13, 14B, 17 according to an embodiment of the present invention.
Figure 19:
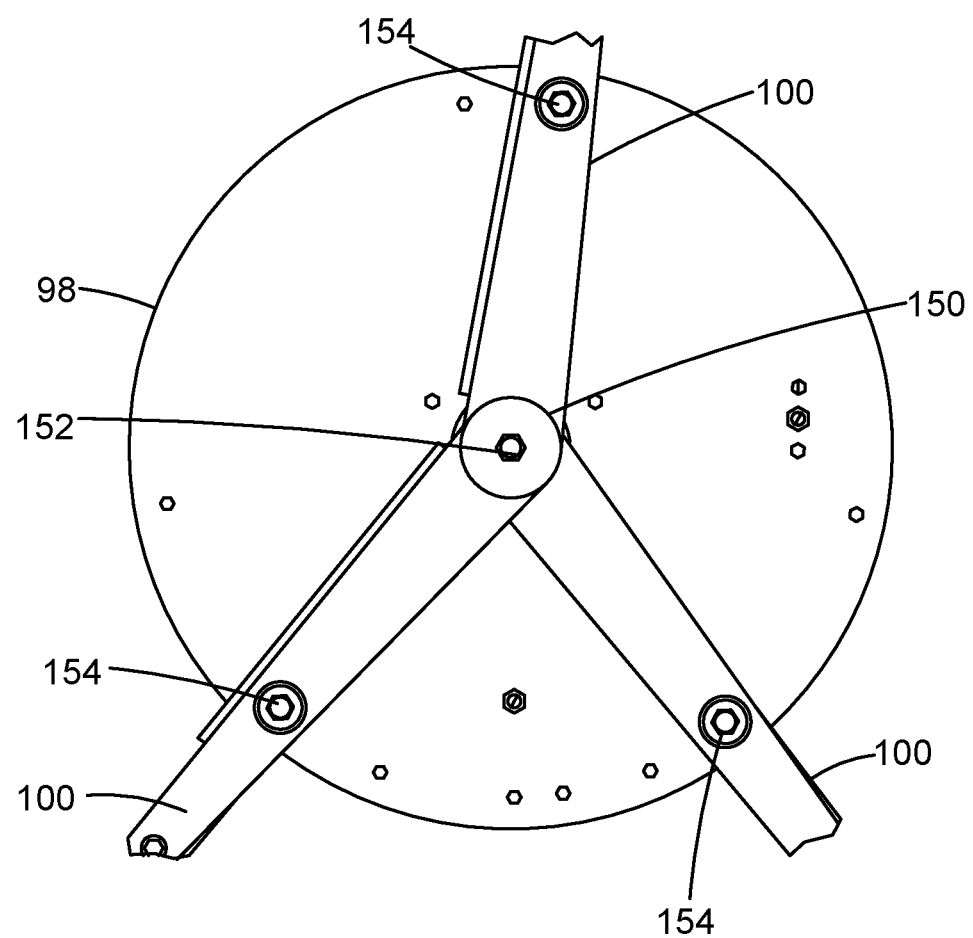
FIG. 19 is a more detailed view of a plurality of the support arms of the phase ring handling tool coupled to the phase ring support head according to an embodiment of the present invention.

The phase ring support head trolley 136 can be configured to enable the phase ring handling tool 24 to translate in yet another movement of direction. In particular, the phase ring support head trolley 136 can displace the phase ring support head 98 in a lateral direction in relation to the vertical support structure 96 and also the vertical extending part 94 of the base unit 88. As shown in FIGS. 17 and 18, the phase ring support head trolley 136 can comprise horizontally extending spaced railings 138 oriented transversely in relation to the vertical support structure 96. FIG. 18 shows a screw drive system 140 operatively coupled to the phase ring support head trolley 136 that is configured to translate the phase ring support head trolley 136 along the horizontally extending spaced railings 138. To this extent, the screw drive system 140 can move the phase ring support head trolley 136, and thus, the phase ring support head 98 and the support arms 100 in a lateral direction in relation to the vertical support structure 96 and the vertical extending part 94 of the base unit 88.

As shown in FIG. 18, the screw drive system 140 can comprise a screw 142 that extends through an outer portion of the phase ring support head trolley 136, and a hand wheel 144 configured to drive the screw 142 to laterally move the phase ring support head 98 in relation to the vertical support structure 96 and the vertical extending part 94 of the base unit 88. FIG. 18, which is a back end view of the phase ring support head trolley 136, shows that the phase ring support head trolley 136 can be coupled to the mounting bracket 124 on the back side of the phase ring support head 98. In operation, manual rotation of the hand wheel 144 causes the drive screw 142 to impart a lateral movement of the phase ring support head trolley 136 along the horizontally extending spaced railings 138. The lateral direction that the phase ring support head trolley 136 moves along the railings 138 will depend on the direction of rotation of the hand wheel 144. Since the phase ring support head 98 and the support arms 100 are coupled to the phase ring support head trolley 136 via the mounting bracket 124, the lateral movement of the trolley will result in a lateral movement of the phase ring support head 98 and the support arms 100. This capability to laterally move the phase ring support head 98 and the support arms 100 in this manner can also be advantageous for the phase ring handling tool 24 when performing operations directed to the phase rings 20 that include inserting, adjusting, removing and picking up the rings.

Although the phase ring handling tool 24 is described with screw drive systems (102, 114, 140) that are manually powered, it is not meant to limit the various embodiments described. The use of manually powered screw drive systems can be advantageous in that it can avoid injury to workers that are tasked with installing and removing phase rings from a generator. In addition, the manually powered screw drive systems can minimize the risk of damage to the components of the generators because it allows the workers to have more control and precision in how they operate the phase ring handling tool 24 while installing or removing phase rings from a generator. Nevertheless, the phase ring handling tool 24 can be implemented with motor-driven screw drive systems.

In addition, it is understood that use of screw drive systems with the phase ring handling tool 24 is not meant to be limiting to the various embodiments. It is contemplated that other types of actuators, whether mechanical or electromechanical, can be used to impart movement to the various components of the phase ring handling tool 24 that includes axial translation, tilting, rotation, vertical displacement and lateral displacement. Examples of some of these mechanical or electromechanical type actuators that can be suitable to use with the phase ring handling tool 24 to facilitate such movement include, but are not limited to, rodless actuators (e.g., belts and pulleys, linear motion actuators, hydraulic actuators, pneumatic actuators).

In addition to the aforementioned components, the phase ring handling tool 24 can be equipped with other elements that facilitate the operations that are performed while installing or removing phase rings from a generator. For example, as shown in FIGS. 13 and 14A, the back end part 92 of the base unit 88 can comprise a weight assembly 146 to counter the weight of the any phase rings 20 supported by the plurality of support arms 100. To this extent, the weight assembly can help keep the phase ring handling tool 24 stable during lifting and traveling with the phase rings 20. In one embodiment, the weight assembly 146 can be configured to evenly distribute the weight of the phase rings 20 about the base unit 88. Also, having the weight assembly 146 at the back end part 92 of the base unit 88, the center of gravity of the phase ring handling tool 24 will be closer to an industrial vehicle 76 such as a forklift that as mentioned before can be used in certain embodiments to transport the phase ring handling tool 24 and the base loader 28.

Other components of the phase ring handling tool 24 can include industrial vehicle coupling receptacles 148 that are configured to receive an industrial vehicle that can be used to facilitate the operations performed by the phase ring handling tool 24. In one embodiment, as shown in FIGS. 13 and 14A, a pair of industrial vehicle coupling receptacles 148 can be located on opposing sides of the base unit 88 of the phase ring handling tool 24. If the industrial vehicle 76 that is used with the phase ring handling tool 24 is a forklift, then the industrial vehicle coupling receptacles 148 can be configured to receive the forks of the forklift. In this manner, the forks of the forklift can be inserted into the industrial vehicle coupling receptacles 148. The forklift can then lift the phase ring handling tool 24 and travel with it to a desired location. Although not shown in the figures, the phase ring handling tool 24 can be implemented with various fasteners including but not limited to screws and chains to secure the phase ring handling tool 24 while traveling.

Turning the discussion now to details regarding the support arms 100 that can be deployed with the phase ring handling tool 24. FIGS. 19 and 20A-20F show how the support arms 100 can be arranged in relation to the phase ring support head 98 that is configured to receive the support arms. The support arms 100, which in one embodiment, can comprise at least three support arms, are positioned about a central location 150 of the phase ring support head 98. In one embodiment, the central location 150 can comprise a hole drilled in the center of the phase ring support head 98. As shown in FIGS. 19 and 20A-20F, the plurality of support arms 100 can be spaced apart a predetermined distance from each other, and can extend radially outward from the central location 150 of the phase ring support head 98. A central fastener 152 such as a nut and bolt assembly can secure the support arms 100 together at the central location 150. A corresponding outer peripheral fastener 154 such as a nut and bolt assembly can be used to secure each support arm 100 in a hole formed adjacent to the outer edge of the phase ring support head 98. Although FIGS. 19 and 20A-20F show three support arms 100 coupled to the phase ring support head 98, it is understood that it is possible to deploy more than three arms.

FIGS. 20A-20F also show that the location of the support arms 100 on the phase ring support head 98 is variable. In general, the location of the support arms 100 will depend on the specific configuration of the phase ring. Some factors that can have a role in determining the location of the support arms 100 include the location of a phase ring clamp connection 156 that can be used to secure open ended portion of the rings and the location of a connection ring tang 158. As shown in FIGS. 20A-20F, the phase ring support head 98 can have one support arm 100 above a midline 155 intersecting the central location 150 and two support arms below the midline (FIGS. 20A, 20C, 20D and 20F) and all support arms 100 below the midline (FIGS. 20B and 20E).

Figure 21B:
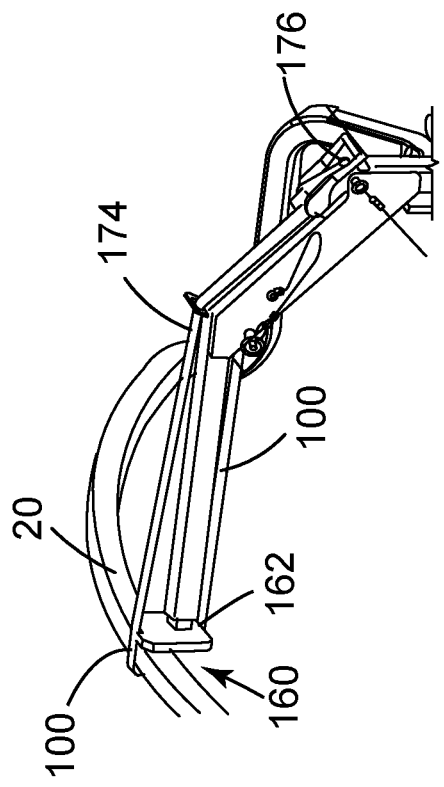
FIGS. 21A and 21B are more detailed views of a support arm for supporting a phase ring depicted in FIG. 21C according to an embodiment of the present invention.
Figure 21A:
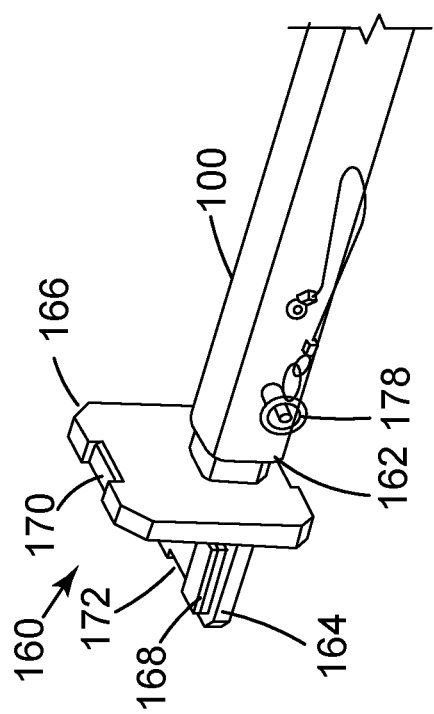
Figure 21C:
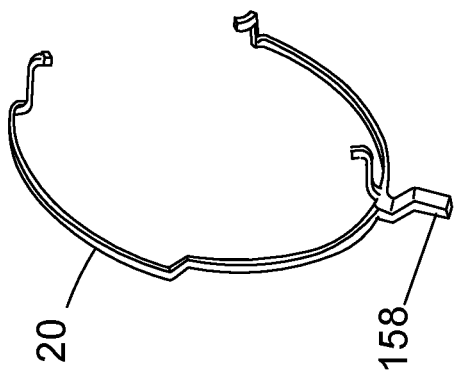

FIGS. 21A and 21B are more detailed views of one of the support arms 100 for supporting a phase ring 20 depicted in FIG. 21C according to an embodiment of the present invention. As shown in FIGS. 21A and 21B, the support arm 100 can have a gripper portion 160 at an end distal 162 to the phase ring support head 98 that is configured to secure one or more phase rings 20. The gripper portion 160 can include a flat platform 164 that abuts against a vertical wall 166 that is normal to the platform 164 and the distal end 162 of the support arm 100. Gripping material 168 can be applied on parts of the platform 164 to provide a form of grip to the phase ring 20 that is placed on the platform. A notch 170 can be formed on the outer top side surface of the vertical wall 166 as can a notch 172 be formed on an outer side surface of the platform 164. In this manner, a strap 174 emanating from a proximal end 176 of the support arm 100 can be used to extend over the notches 170 and 172 to secure the phase ring 20 on the platform 164 against the vertical wall 166. The strap 174 can extend underneath bottom surface of the platform 164, the vertical wall 166, and the arm 100 back to the proximal end 176. In one embodiment, the gripper portion 160 can be adjustable to move radially in relation to the phase ring support head. That is, the gripper portion 160 can be extended outward or retracted inward. In one embodiment, a pin 178 can be used to fix the position of the gripper portion 160 with respect to the distal end 162 of the support arm 100.

The gripper portion 160 configuration depicted in FIGS. 21A and 21B is not meant to be limiting to the various embodiments. It is contemplated that the gripper portion can take the form of a number of different configurations. Those skilled in the art will appreciate that the specific configuration of the phase rings and the number of rings that are to be supported by the support arms will have a role in what design is best suited to be used for the gripper.

In accordance with one embodiment of the present invention, the aforementioned phase ring handling tool 24, the phase ring loading tool 26, and the base loader 28 can be used in a method for installing one or more phase rings in an electric generator. The method can comprise loading one or more phase rings 20 on the phase ring loading tool 26. The phase rings 20 can be removed from the phase ring loading tool 26 with the phase ring handling tool 24 after tilting the phase ring loading tool from a horizontal orientation to a vertical orientation. The one or more phase rings 20 can then be installed in the generator 12 with the phase ring handling tool 24. The method can further comprise using the base loader 28 to facilitate the loading of the phase rings 20 on the phase ring loading tool 26, and the installing of the rings in the generator 12. In particular, the method can comprise placing the base loader 28 adjacent to the phase ring loading tool 26 while in the vertical position in order to facilitate removal of the phase rings 20 from the phase ring loading tool 26 with the phase ring handling tool 24. In addition, the method can comprise placing the base loader 28 adjacent to the generator 12 to facilitate installation of the phase rings 20 in the generator with the phase ring handling tool 24. The installing of the phase rings 20 in the generator 12 can comprise moving the phase ring handling tool 24 through up to five degrees of movement to facilitate the installation of the rings in the generator.

According to another embodiment, the phase ring handling tool 24, the phase ring loading tool 26, and the base loader 28 can be used in a system and a method for simulating installation of phase rings in a generator for purposes of training personnel. FIGS. 22 and 23 show a mockup of a stator end 180 of an electric generator 12 that can be used with the phase ring handling tool 24 to simulate installation of the phase rings 20 in a generator 12 for training personnel. As shown in FIG. 22, the stator end mockup 180 can include scaled up replications of a casing 14, a stator 16 in the casing, and stator windings 18 distributed circumferentially around the stator end. FIG. 23 shows the phase ring handling tool 24 and the base loader 28 adjacent the stator end mockup 180 and ready to be used by workers to simulate the installation or removal of phase rings from the mock up. In particular, the phase ring handling tool 24 can be placed in a closer position to the stator end mockup 180 by moving along the base loader 28. When the phase ring handling tool 24 is moved into a desired location, one or more workers can use the phase ring handling tool 24 to practice installing the phase rings 20. In particular, the workers can practice operating the phase ring handling tool 24 to move through any of the aforementioned five degrees of movement to facilitate the installation of the phase rings 20 in the stator end mockup 180.

Practicing the installation of the phase rings 20 in the stator end mockup 180 will be beneficial in that workers will become adept in installing and removing phase rings. As a result of this practice, the quality and productivity of the workers in performing these operations will improve greatly as more time is spent learning and practicing the operations. In addition, the safety of the workers should improve with this training, minimizing serious injuries that could typically arise while installing and removing phase rings from a generator.

From the description of the illustrated embodiments presented herein, it should be evident that the subject disclosure sets forth an effective solution to installing phase rings in a generator, as well as removing used phase rings from the generator in a manner that obviates the need to use a crane to perform these operations. In particular, the phase ring handling tool with the use of the phase ring loading tool and the base loader avoid the aforementioned issues of using a crane to install, remove, and service phase rings. It has been found that these components as described in the various embodiments can install and remove phase rings from a generator in less than 13 days. This provides a significant reduction in the amount of time that the generator is offline while the phase rings are installed or removed. The less outage time that the generator undergoes, means that the power operator will be more profitable. From a service point of view, there will be more confidence that necessary service work can be done according to a specified schedule which is not the case when crane availability issues arise. In addition, the use of the phase ring handling tool with the phase ring loading tool and the base loader to install, remove and service phase rings ensures that workers are safer and less prone to serious injuries as the risk of harm from an uncontrolled crane load is nullified. Also, the precision and control that is afforded by the phase ring handling tool with its capability to move through different degrees of movements will lower the risk of unintended damage to the phase rings as well as other components of the generator. As a result of this precision and control, the installation and removal of the phase rings can occur while the stator windings are still in place in the generator, avoiding an undesired rewind. Further, allowing workers to use the phase ring handling tool with the stator end mockup to practice and refine their skills in installing, removing, and servicing phase rings will increase their productivity and improve quality of their actions, as well as boost worker safety.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. For example, parts, components, steps and aspects from different embodiments may be combined or suitable for use in other embodiments even though not described in the disclosure or depicted in the figures. Therefore, since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below. For example, references to "one embodiment" of the present invention are not intended to be interpreted as excluding the existence of additional embodiments that also incorporate the recited features.

In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. The terms "substantially," "generally," and "about" indicate conditions within reasonably achievable manufacturing and assembly tolerances, relative to ideal desired conditions suitable for achieving the functional purpose of a component or assembly. Further, the limitations of the following claims are not written in means-plus-function format and are not intended to be interpreted as such, unless and until such claim limitations expressly use the phrase "means for" followed by a statement of function void of further structure.

Moreover, articles "a" and "an" as used in the subject specification and annexed drawings should generally be construed to mean "one or more" unless specified otherwise or clear from context to be directed to a singular form. Additionally, term "plurality" should be understood also as "at least one".

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes", "has", "possesses", and the like are used in the detailed description, claims, appendices and drawings, such terms are intended to be inclusive in a manner similar to the term "comprising" as "comprising" is interpreted when employed as a transitional word in a claim. That is, unless explicitly stated to the contrary, embodiments "comprising", "including", or "having" an element or a plurality of elements having a particular property may include additional such elements not having that property.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. An electric generator phase ring handling tool, comprising: a base unit configured to move in a fore and aft direction, wherein the base unit includes a front-end part, a back-end part and a vertical extending part between the front-end part and the back-end part;
    a vertical support structure coupled to the base unit, wherein the vertical support structure is configured to tilt towards and away from the vertical extending part;
    a phase ring support head coupled to the vertical support structure, wherein the phase ring support head is configured to rotate and move along the vertical extending part of the base unit;
    at least three support arms coupled to the phase ring support head, wherein said at least three support arms are configured to support one or more electric generator phase rings; and
    wherein the vertical extending part is coupled to the vertical support structure with a first drive system, wherein the first drive system is configured to tilt the vertical support structure towards and away from the vertical extending part of the base unit, and the first drive system is a screw drive system comprising a screw and a hand wheel configured to drive the screw.

2. The electric generator phase ring handling tool of claim 1, wherein the first drive system is only hand-operated and/or only hand-powered.

3. The electric generator phase ring handling tool of claim 1, wherein the vertical support structure comprises a second drive system operatively coupled to the phase ring support head, wherein the second drive system is a screw drive system configured to rotate the phase ring support head in relation to the vertical extending part of the base unit.

4. The electric generator phase ring handling tool of claim 3, wherein the second drive system is only hand-operated and/or only hand-powered.

5. The electric generator phase ring handling tool of claim 1, wherein the vertical support structure comprises a third drive system configured to displace the phase ring support head in a vertical direction along the vertical support structure.

6. The electric generator phase ring handling tool of claim 5, wherein third drive system comprises a chain hoist assembly configured to displace the phase ring support head in a vertical direction along the vertical support structure.

7. The electric generator phase ring handling tool of claim 6, wherein the chain hoist assembly comprises vertically extending spaced railings disposed on the vertical support structure, a phase ring support head trolley to secure the phase ring support head thereto and configured to move along the vertically extending spaced railings, and a pull chain operatively coupled with the phase ring support head trolley that is configured to translate the phase ring support head trolley along the vertically extending spaced railings in the vertical direction.

8. The electric generator phase ring handling tool of claim 7, wherein the phase ring support head trolley comprises horizontally extending spaced railings oriented transversely in relation to the vertical support structure and a screw drive system operatively coupled to the phase ring support head trolley, wherein the screw drive system is configured to translate the phase ring support head trolley along the horizontally extending spaced railings, moving the phase ring support head trolley in a lateral direction in relation to the vertical support structure.

9. The electric generator phase ring handling tool of claim 5, wherein the third drive system is only hand-operated and/or only hand-powered.

10. The electric generator phase ring handling tool of claim 1, wherein the back-end part of the base unit comprises a weight assembly for countering the weight of said one or more electric generator phase rings.

11. The electric generator phase ring handling tool of claim 1, wherein the electric generator phase ring handling tool further comprises at least one base loader for supporting the base unit on said base loader, wherein the base loader includes one, two or more rails configured to move the base unit in a fore and aft direction along said one, two or more rails and wherein the base loader includes an industrial vehicle coupling receptacles configured to receive forks of a forklift.

12. The electric generator phase ring handling tool of claim 1, wherein the electric generator phase ring handling tool further comprises at least two base loaders, wherein at least one base loader comprises a platform having a top side and a bottom side and at least two bottom side beams coupled to the bottom side of the platform, wherein said bottom side beams are longer than the platform and are configured to support said at least one base loader.

13. A system for servicing or installing one or more phase rings in an electric generator, comprising:
a phase ring loading tool configured to support said one or more phase rings when said one or more phase rings are oriented parallel to the ground or perpendicular to the ground; and
the phase ring handling tool as defined in claim 1.

14. The system of claim 13, wherein the phase ring loading tool comprises:
a frame structure including a first end part, a second end part, and a middle part between the first end part and the second end part,
the frame structure having spaced beams extending from the first end part to the second end part,
first end protruding beams extending outward from each of the spaced beams at the first end part,
second end protruding beams extending outward from each of the spaced beams at the second end part, a truss assembly in the middle part to provide geometric stability to the spaced beams extending from the first end part to the second end part, and
at least three arms configured to support said one or more phase rings parallel to the spaced beams, and wherein the second end part is configured to support the phase ring loading tool in the upright position.

15. The system of claim 14, wherein the phase ring loading tool further comprises a first arm bracket support assembly coupled to the frame structure between the first end part and the middle part and a second arm bracket support assembly coupled to the frame structure between the middle part and the second end part, the first arm bracket support assembly includes at least one or more arms and the second arm bracket support assembly includes at least two or more arms.

16. The system of claim 13, wherein the phase ring handling tool comprises a base loader, wherein the base loader includes:
a platform having a top side and a bottom side;
a plurality of bottom side beams coupled to the bottom side of the platform; one, two or more rails coupled to the top side of the platform; and
a phase ring handling tool carriage configured to receive the phase ring handling tool and travel along said one or more rails with the phase ring handling tool thereon.

17. A method for servicing or installing one or more phase rings in an electric generator with the system for servicing or installing one or more phase rings in an electric generator as defined in claim 13,
wherein the system comprises the phase ring loading tool configured to receive said one or more phase rings and the phase ring handling tool to remove said one or more phase rings from the phase ring loading tool and to facilitate installation of the one or more phase rings in the electric generator, wherein the method comprises:
assembling said one or more phase rings on the phase ring loading tool to obtain assembled one or more phase rings on the phase ring loading tool, wherein the phase ring loading tool is in horizontal position,
elevating the phase ring loading tool to the upright position together with the assembled one or more phase rings,
removing the one or more phase rings from the phase ring loading tool with the phase ring handling tool, and installing the one or more electric generator phase rings in the electric generator with the phase ring handling tool.

18. The method of claim 17, wherein after the step of elevating the phase ring loading tool to the upright position and before the step of removing the one or more phase rings from the phase ring loading tool with the phase ring handling tool, the method further comprises:
removing one or more phase rings from the electric generator with the phase ring handling tool, or after the step of removing the one or more phase rings from the phase ring loading tool with the phase ring handling tool and before the step of installing the one or more electric generator phase rings in the electric generator with the phase ring handling tool, the method further comprises removing one or more phase rings from the electric generator with another phase ring handling tool.

19. The method of claim 17, wherein the electric generator is combined with a nuclear steam source at a nuclear power plant or is combined with a fossil steam source at a fossil power plant or the electric generator comprising a stator.

* * * * *